(12) United States Patent
Van De Wiel et al.

(10) Patent No.: US 12,728,535 B2
(45) Date of Patent: Sep. 8, 2026

(54) APPARATUSES AND METHODS FOR CLASSIFYING AND/OR CONTROLLING MOTION OF AN ACTUATOR

(71) Applicant: Sony Group Corporation, Tokyo (JP)

(72) Inventors: Thomas Van De Wiel, Zurich (CH); Seyed Sina Mirrazavi Salehian, Morges (CH); Mireille El Gheche, Zurich (CH)

(73) Assignee: Sony Group Corporation, Tokyo (JP)

( * ) Notice: Subject to any disclaimer, the term of this patent is extended or adjusted under 35 U.S.C. 154(b) by 113 days.

(21) Appl. No.: 18/706,863

(22) PCT Filed: Nov. 18, 2022

(86) PCT No.: PCT/EP2022/082388
§ 371 (c)(1),
(2) Date: May 2, 2024

(87) PCT Pub. No.: WO2023/089086
PCT Pub. Date: May 25, 2023

(65) Prior Publication Data

US 2025/0026016 A1 Jan. 23, 2025

(30) Foreign Application Priority Data

Nov. 18, 2021 (EP) .................................... 21209145

(51) Int. Cl.
*B25J 9/16* (2006.01)

(52) U.S. Cl.
CPC .................................. *B25J 9/1674* (2013.01)

(58) Field of Classification Search
CPC ..... B25J 9/1674; B25J 9/1664; G05B 19/416; G05B 2219/43065; G05B 2219/43062; G05B 2219/43203; G05B 2219/40454
See application file for complete search history.

(56) References Cited

U.S. PATENT DOCUMENTS 9,764,469 B1 * 9/2017 Sun ........................ B25J 9/1664
10,981,274 B2 4/2021 Leitner et al.
2009/0076652 A1 * 3/2009 Wieland ............... G05B 19/416 700/250
2011/0093191 A1 * 4/2011 Trovato ............... G06Q 10/047 701/533

(Continued)

FOREIGN PATENT DOCUMENTS

KR 20170044987 A 4/2017

OTHER PUBLICATIONS

Zhao; “Trajectory Smoothing using Jerk Bounded Shortcuts for Service Manipulator Robots”; 2015 IEEE/RSJ International Conference on Intelligent Robots and Systems; pp. 4929-4934; 2015 (Year: 2015).*

*Primary Examiner* — Stephen Holwerda
(74) *Attorney, Agent, or Firm* — Tucker Ellis LLP

(57) ABSTRACT

Provided herein are methods for classifying and/or controlling motion of an actuator. The concept is based on classifying potential motion states located within motion limits of the actuator as safe or unsafe based on one or more potential motion trajectories and motion state constraints. Then, a current motion state of the actuator may be determined, and the actuator may be controlled based on the actuator's current motion state and a grid of motion states classified as safe or unsafe.

20 Claims, 13 Drawing Sheets

(56) References Cited

U.S. PATENT DOCUMENTS

| | | | | |
|---|---|---|---|---|
| 2018/0229368 | A1* | 8/2018 | Leitner | B25J 9/1602 |
| 2021/0053220 | A1* | 2/2021 | Ames | B25J 9/1664 |
| 2022/0088780 | A1* | 3/2022 | Abdul-Hadi | B25J 9/1664 |

* cited by examiner

FIG. 1
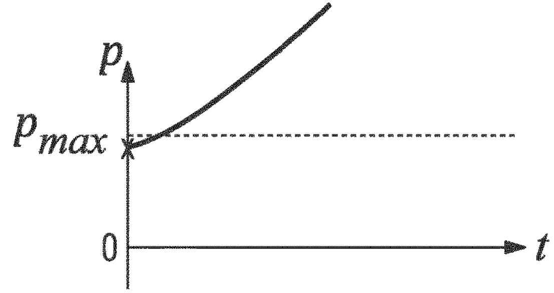
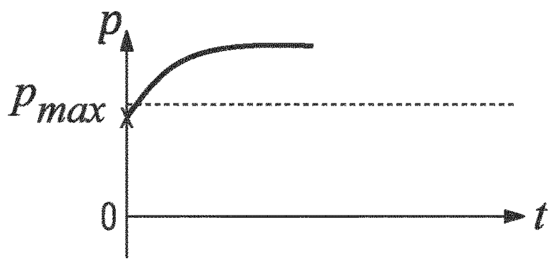
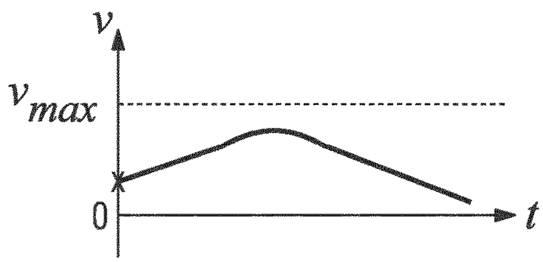
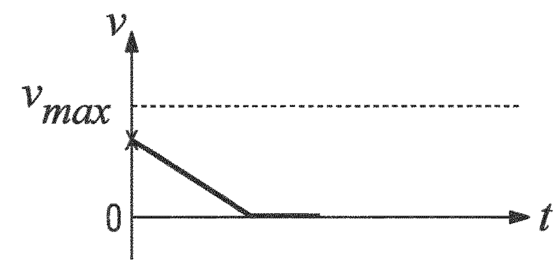
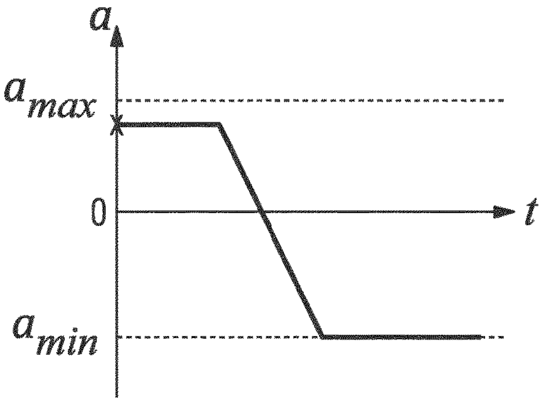

v
22
$v_{max}$
24
$p_{min}$
$p_{max}$
p
$v_{min}$
Safe operation space for considering constraints on the states
separately
jointly v
22
$v_{max}$
24
26
$p_{min}$
$p_{max}$
p
$v_{min}$
Hard constraints on the states
Soft constraints to ensure safe operation
Exact safe operation space 80
classifying potential motion states as safe or unsafe
82
determining a current motion state of the actuator
84
controlling the actuator based on the actuator's current motion state and a grid of potential motion states classified as safe or unsafe
86

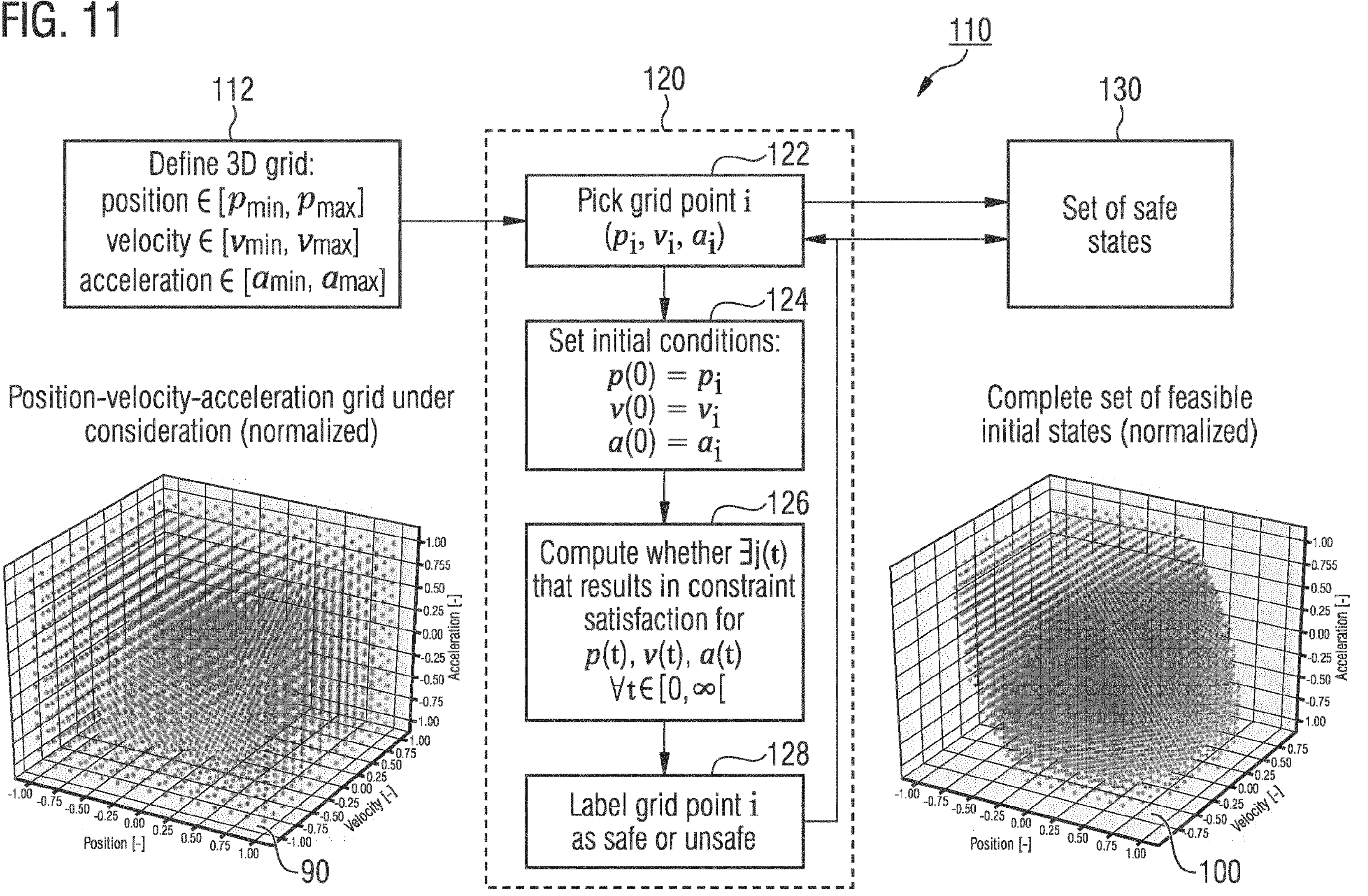

FIG. 11
110
112
Define 3D grid:
position ∈ [$p_{min}$, $p_{max}$]
velocity ∈ [$v_{min}$, $v_{max}$]
acceleration ∈ [$a_{min}$, $a_{max}$]
120
122
Pick grid point i
($p_i$, $v_i$, $a_i$)
124
Set initial conditions:
$p(0) = p_i$
$v(0) = v_i$
$a(0) = a_i$
126
Compute whether ∃j(t)
that results in constraint
satisfaction for
$p(t)$, $v(t)$, $a(t)$
∀t ∈ [0, ∞[
128
Label grid point i
as safe or unsafe
130
Set of safe
states
Position-velocity-acceleration grid under
consideration (normalized)
90
Complete set of feasible
initial states (normalized)
100
Position [-]
Velocity [-]
Acceleration [-]

146
Reference
State
144
Classifier
142
safe
unsafe
148
Controller
Safety procedure
149
140
Actuator
Prismatic
or
Revolute
150
Sensor
160
State
On-line
100
Off-line
Set of safe and unsafe states
Complete set of feasible initial states (normalized)
Acceleration [-]
Velocity [-]
Position [-]

FIG. 13

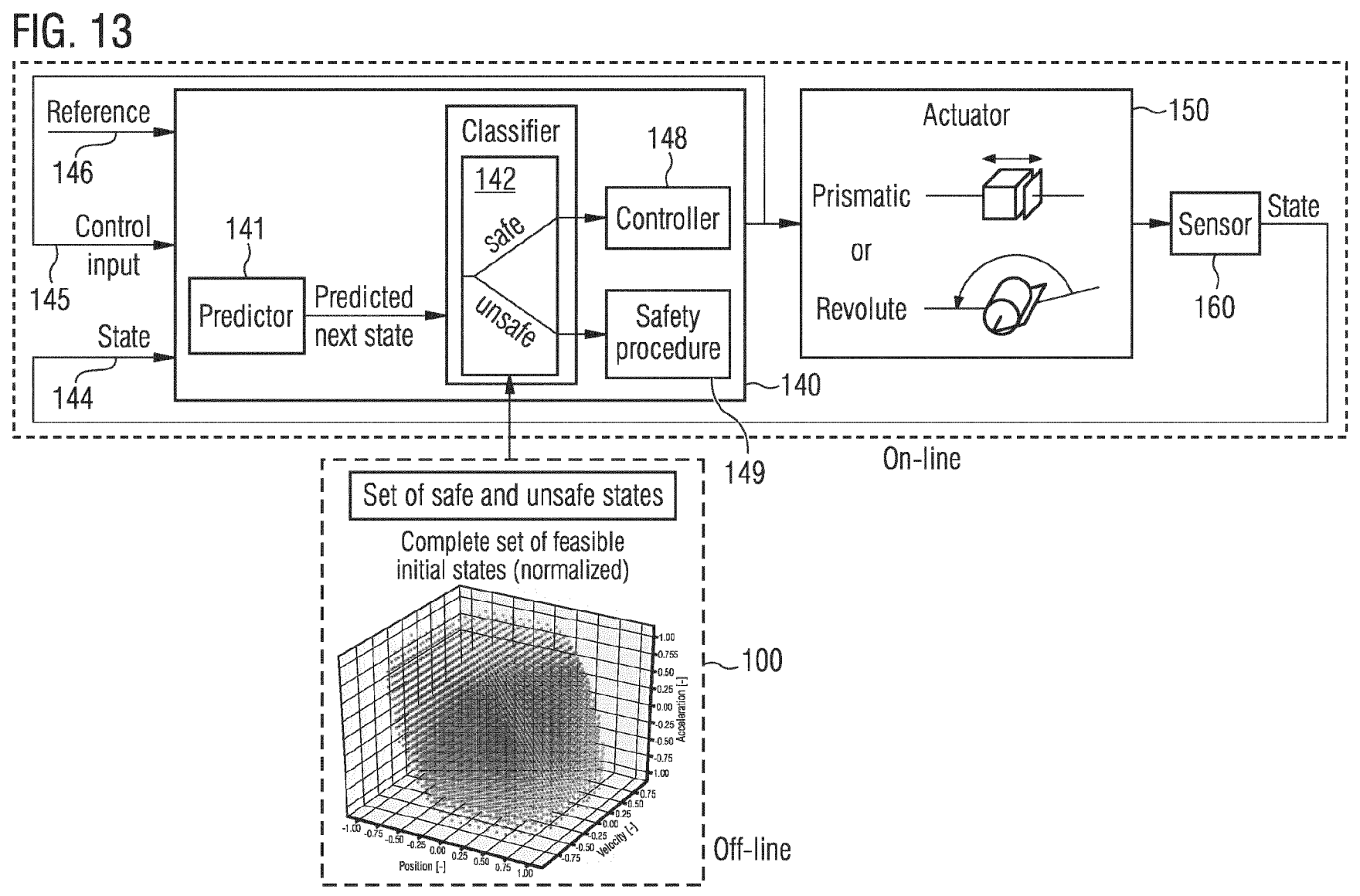

Reference 146
Control input 145
State 144
Predictor 141
Predicted next state
Classifier 142
safe
unsafe
148 Controller
Safety procedure 149
140
Actuator 150
Prismatic or Revolute
Sensor 160
State
On-line
Off-line
100
Set of safe and unsafe states
Complete set of feasible initial states (normalized)
Position [-]
Velocity [-]
Acceleration [-]

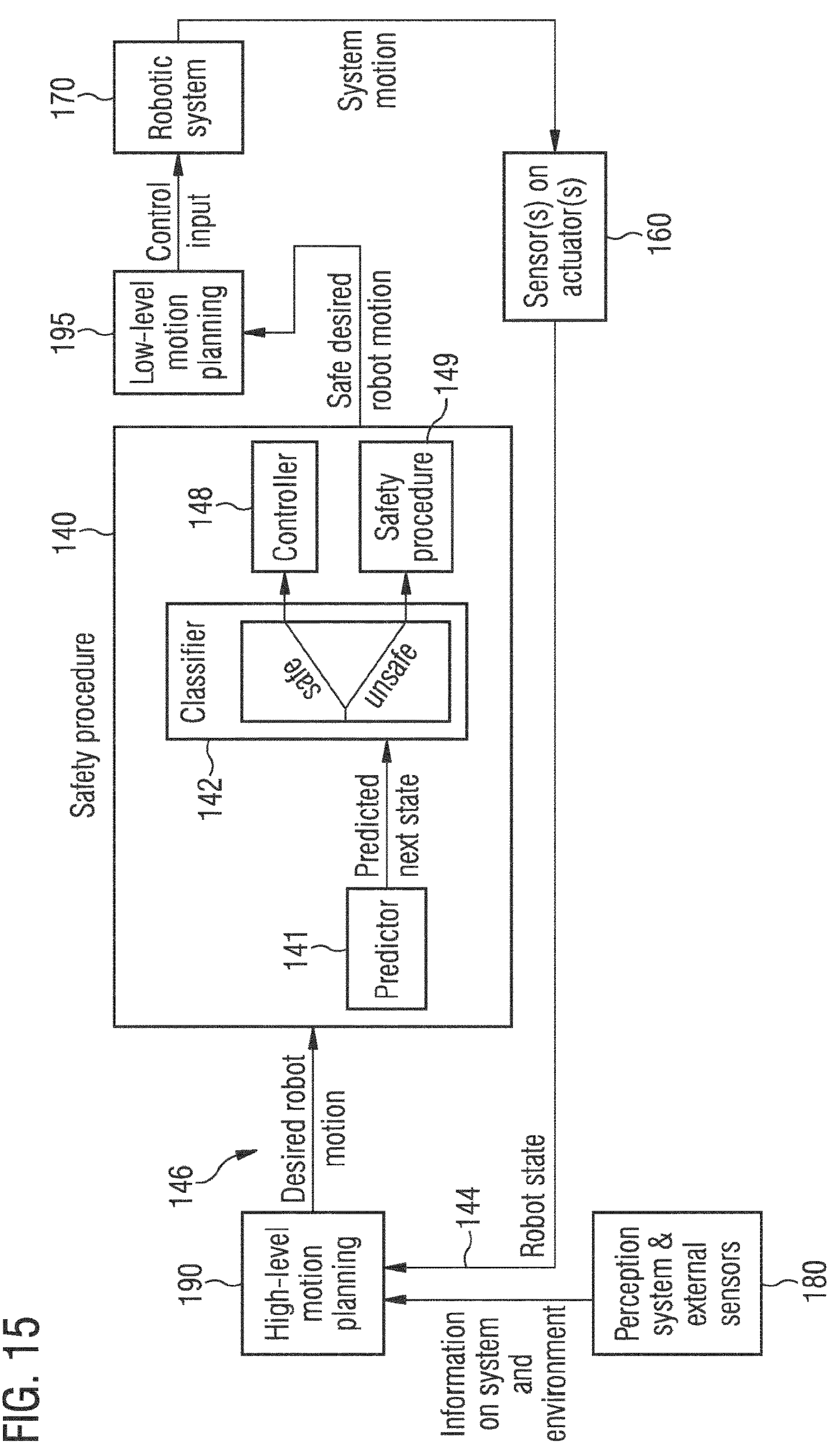

FIG. 15
190
High-level motion planning
146
Desired robot motion
144
Robot state
Information on system and environment
Perception system & external sensors
180
140
Safety procedure
141
Predictor
Predicted next state
142
Classifier
safe
unsafe
148
Controller
Safety procedure
149
Safe desired robot motion
195
Low-level motion planning
Control input
170
Robotic system
System motion
Sensor(s) on actuator(s)
160

APPARATUSES AND METHODS FOR CLASSIFYING AND/OR CONTROLLING MOTION OF AN ACTUATOR

FIELD

The present disclosure generally relates to apparatuses and methods for classifying and/or controlling motion of an actuator within safe operational limits.

BACKGROUND

Actuators, such as revolute and prismatic actuators, can be classified based on the energy they use to move. Hydraulic actuators may be used in robots handling heavy loads. With pneumatic actuators, instead of hydraulic fluid, compressed air is used to move pistons or the like. Commonly used actuators in robotics comprise electric actuators. This actuator converts electric energy into linear or rotary motion. Actuators may face kinematic and dynamics limitation at any level including linear/rotational position, velocity, acceleration, and jerk levels. Operating an actuator beyond these limits may cause irreversible damage to both the actuator itself and to its environment.

Thus, there is a demand for operating actuators within safe operational limits.

SUMMARY

This demand is addressed by apparatuses and methods in accordance with the independent claims. Possibly advantageous embodiments are addressed by the dependent claims.

According to a first aspect, the present disclosure proposes a method for classifying and/or controlling motion of an actuator. The method may be a computer-implemented method. The method comprises classifying potential motion states located within motion limits of the actuator as safe or unsafe based on one or more potential motion trajectories and motion state constraints, determining a current motion state of the actuator, and controlling the actuator based on the actuator's current motion state and a grid of potential motion states classified as safe or unsafe.

In some embodiments, classifying potential motion states of the actuator comprises determining a grid of initial motion states located within the motion limits of the actuator. For each initial motion state of the grid, it may be determined whether there exists a (feasible) jerk trajectory that satisfies motion constraints on position, velocity, and acceleration. If such a jerk trajectory is found, the initial motion state under consideration may be classified as a safe motion state, otherwise it may be classified as unsafe.

In some embodiments, determining the grid of initial motion states comprises determining position-velocity-acceleration triplets located within current actuator position, velocity, and acceleration limits, wherein position$\in[p_{min}, p_{max}]$, velocity$\in[v_{min}, v_{max}]$, and acceleration$\in[a_{min}, a_{max}]$.

In some embodiments, for each initial motion state of the grid, acceleration, velocity, and position trajectories (derived from jerk) are computed by integrating their respective higher order derivatives. For each initial motion state of the grid, an acceleration trajectory may be computed based on the jerk trajectory, a velocity trajectory may be computed based on the acceleration trajectory, and a position trajectory may be computed based on the velocity trajectory.

In some embodiments, the jerk trajectory at time k may be denoted as j[k] and p[0], v[0], a[0] may define an initial motion state within the grid. An acceleration of the actuator at time k+1 may be computed according to a[k+1]=a [k]+j [k]·Δt, a velocity of the actuator at time k+1 may be computed according to $$v[k+1] = v[k] + a[k]\cdot\Delta t + \frac{1}{2}\cdot j[k]\cdot\Delta t^2,$$

and a position of the actuator at time k+1 may be computed according to $$p[k+1] = p[k] + v[k]\cdot\Delta t + \frac{1}{2}\cdot a[k]\cdot\Delta t^2 + \frac{1}{6}\cdot j[k]\cdot\Delta t^3.$$

In some embodiments, determining whether there exists a jerk trajectory that satisfies the state constraints comprises determining whether the jerk trajectory at time k is within jerk limits, whether the acceleration trajectory at time k is within acceleration limits, whether the velocity trajectory at time k is within velocity limits, and whether the position trajectory at time k is within position limits.

In some embodiments, determining whether there exists a jerk trajectory that satisfies the state constraints comprises determining whether there exists a jerk trajectory from an initial state of the initial grid that satisfies state constraints up to a terminal time.

In some embodiments, determining whether there exists a jerk trajectory that satisfies the state constraints comprises determining a jerk trajectory that results in a time-optimum (minimal time) motion from an initial state of the initial grid to a final state at the terminal time.

In some embodiments, the final state at terminal time T satisfies v(T)=a(T)=0. That is, the velocity and the acceleration at terminal time T may both be zero.

In some embodiments, the jerk trajectory at time k is determined according to $j[k]\in\{j_{min}, j_{max}, 0\}$. That is, j[k] may be selected from minimum jerk, maximum jerk, and zero jerk.

In some embodiments, the jerk trajectory from k=0 to k=K−1 may be represented as $$j = \begin{bmatrix} j[0] \\ \vdots \\ j[K-1] \end{bmatrix} \in \mathbb{R}^K,$$

the acceleration trajectory from k=0 to k=K−1 may be represented as $$a = \underbrace{a[0]\cdot\mathbb{1}}_{r_{acc}} + \underbrace{\Delta t\cdot S}_{A_{acc}}\cdot j,$$

the velocity trajectory from k=0 to k=K−1 may be represented as $$v = \underbrace{v[0]\cdot\mathbb{1} + a[0]\cdot\Delta t\cdot S\cdot\mathbb{1}}_{r_{vel}} + \underbrace{\Delta t^2\cdot S\cdot\left(\frac{1}{2}S+1\right)}_{A_{vel}}\cdot j,$$

the position trajectory from k=0 to k=K−1 may be represented as $$p = \underbrace{p[0]\cdot\mathbb{1} + v[0]\cdot\Delta t\cdot S\cdot\mathbb{1} + \frac{1}{2}a[0]\cdot\Delta t^2\cdot S + a[0]\cdot\Delta t^2\cdot S\cdot S\cdot\mathbb{1}}_{r_{pos}} + \underbrace{\Delta t^3\cdot\left(S\cdot S + S + \frac{1}{6}I\right)\cdot S}_{A_{pos}}\cdot j,$$

wherein $$S \in \mathbb{R}^{K\times K}$$

is based on $$a[k+1] = a[k]\cdot + j[k]\cdot\Delta t,$$

$$v[k+1] = v[k] + a[k]\cdot\Delta t + \frac{1}{2}\cdot j[k]\cdot\Delta t^2, \text{ and}$$

$$p[k+1] = p[k] + v[k]\cdot\Delta t + \frac{1}{2}\cdot a[k]\cdot\Delta t^2 + \frac{1}{6}\cdot j[k]\cdot\Delta t^3$$

and $$\mathbb{1} = [1, \cdots, 1] \in \mathbb{R}^K.$$

In some embodiments, determining whether there exists a jerk trajectory that satisfies all state constraints comprises minimizing a sum of a first squared norm of the acceleration and the velocity vectors $r_{vel}$ and $A_{vel}$ j and a second first squared norm of the acceleration vectors $r_{acc}$ and $A_{acc}$ j.

In some embodiments, determining whether there exists a jerk trajectory that satisfies all state constraints is based on $$\text{minimize}_{j\in\mathbb{R}^K} \|r_{vel} + A_{vel}j\|^2 + \|r_{acc} + A_{acc}j\|^2 \text{ s.t. } \begin{cases} j_{min} \le j \le j_{max} \\ a_{min} \le r_{acc} + A_{acc}j \le a_{max} \\ v_{min} \le r_{vel} + A_{vel}j \le v_{max} \\ p_{min} \le r_{pos} + A_{pos}j \le p_{max} \end{cases}.$$

In some embodiments, determining whether there exists a jerk trajectory that satisfies motion state constraints comprises using a quadratically-constrained quadratic programming or conic quadratic programming algorithm. A quadratically constrained quadratic program (QCQP) is an optimization problem in which both the objective function and the constraints are quadratic functions. Solving the general case is an NP-hard problem. There are two main relaxations of QCQP: using semidefinite programming (SDP) and using the reformulation-linearization technique (RLT). Conic quadratic optimization, also known as second-order cone optimization, is a straightforward generalization of linear optimization, in the sense a linear function may be optimized under linear (in)equalities with some variables belonging to one or more (rotated) quadratic cones.

In some embodiments, determining the actuator's current motion state comprises estimating, using one or more motion sensors, the actuator's current motion state at a sample rate at which the actuator is controlled.

In some embodiments, determining the actuator's current motion state comprises predicting the current motion state based on one or more previous motions states.

In some embodiments, controlling the actuator comprises comparing the actuator's current motion state and a desired subsequent motion state against the grid of motion states classified as safe or unsafe to determine whether the current and/or the desired subsequent motion state are safe or not.

In some embodiments, controlling the actuator comprises moving the actuator to the desired subsequent motion state if the actuator's current motion state and the desired subsequent motion state are classified as safe, or executing a predefined safety procedure if the actuator's current motion state and/or the desired subsequent motion state are classified as unsafe.

According to another aspect of the present disclosure, there is provided a non-transitory computer program product for being executed on a programmable hardware device (computer), including computer readable program that causes the computer to classify potential motion states located within motion limits of the actuator as safe or unsafe based on one or more potential motion trajectories and motion state constraints, determine a current motion state of the actuator, and control the actuator based on the actuator's current motion state and a grid of potential motion states classified as safe or unsafe.

According to a further aspect, the present disclosure proposes an apparatus for classifying and/or controlling motion of an actuator. The apparatus comprising control circuitry configured to classify potential motion states located within motion limits of the actuator as safe or unsafe based on one or more potential motion trajectories and motion state constraints, determine a current motion state of the actuator, and control the actuator based on the actuator's current motion state and a grid of motion states classified as safe or unsafe. The skilled person having benefit from the present disclosure will appreciate that the control circuitry may comprise analog and/or digital hardware components.

In some embodiments, the control circuitry is configured to, for each motion state of the potential motion states located within motion limits of the actuator, determine whether there exists a jerk trajectory that satisfies motion state constraints on position, velocity, and acceleration. If such a jerk trajectory is found, the circuitry is configured to classify the motion state under consideration as a safe motion state, otherwise classify it as unsafe.

In some embodiments, the control circuitry is configured to move the actuator to a desired subsequent motion state if the actuator's current motion state and the desired subsequent motion state are classified as safe or execute a predefined safety procedure if the actuator's current motion state and/or the desired subsequent motion state are classified as unsafe.

According to yet a further aspect, the present disclosure proposes an apparatus for controlling an actuator. The apparatus comprises circuitry configured to determine a current and/or desired motion state of the actuator, classify the current and/or desired motion state as safe or unsafe based on one or more potential motion trajectories and motion state constraints, and control the actuator based on whether the actuator's motion state has been classified as safe or unsafe.

In some embodiments, circuitry configured to determine a motion state of the actuator comprises one or more motion sensors.

In some embodiments, circuitry configured to determine the motion state of the actuator comprises a predictor configured to predict the motion state based on one or more previous motions states.

In some embodiments, (classifier) circuitry configured to classify the motion state comprises a neural network processor.

In some embodiments, (control) circuitry configured to control the actuator implements a pre-defined safety procedure to avoid motion state constraint violation if the motion state is unsafe.

Embodiments of the present disclosure may allow actuator operation within safe operational limits for any general one- or more degree freedom actuator, using information on its kinematic limits; e.g. position, velocity, acceleration and jerk limits. Considering the limits on the state variables (e.g., position, velocity, acceleration) in an isolated way may not be sufficient for ensuring safe operation of an actuator. It is proposed to control within safe operational limits by considering the actuator limits on position, velocity, acceleration, and jerk level jointly. Given these limits, a set of safe operation states may be calculated in terms of position-velocity-acceleration pairs and control a robot to stay within the safe states.

BRIEF DESCRIPTION OF THE FIGURES

Some examples of apparatuses and/or methods will be described in the following by way of example only, and with reference to the accompanying figures, in which FIG. 1 shows an illustration of unavoidable constraint violation in the future for a situation where all states are within the actuator limits. Left: limit on jerk level, right: no limit on jerk level;

FIG. 11 shows a schematic of a proposed safe state computation (constant state constraints);

FIG. 13 illustrates another example of an implementation of the proposed concept;

FIG. 14 illustrates an example use case;

FIG. 15 illustrates a block diagram of the example use case; and

DETAILED DESCRIPTION

Figure 2:
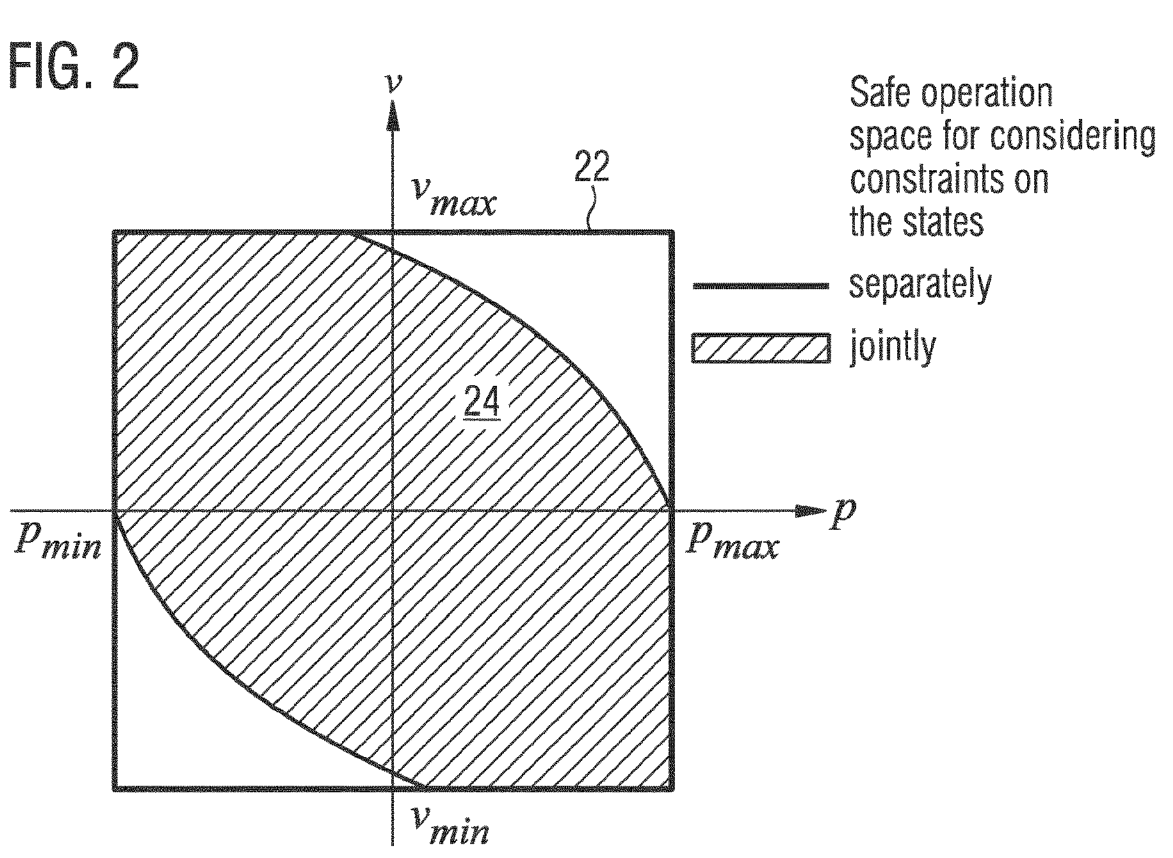
FIG. 2 shows an example of a safe operation space considering the states separately or jointly.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Throughout the following description, the following symbols will be used:

| Symbol | Meaning |
|---|---|
| p | Position |
| v | Velocity |
| a | Acceleration |
| j | Jerk |
| t | time |
| x[k] | k-th discretization step of variable x |
| x(t) | Trajectory of variable x over time |
| x | vector of x [k] |

A motion state of an actuator may be considered as a combination of all the following state variables: position, velocity, acceleration, jerk of the actuator. An actuator may be a component of a machine, e.g., a robot, that is responsible for moving and controlling a mechanism or system, for example by opening a valve. An actuator requires one or more control signals and a source of energy. The control signal is relatively low energy and may be electric voltage or current, pneumatic, or hydraulic fluid pressure, for example. Its main energy source may be an electric current, hydraulic pressure, or pneumatic pressure. When it receives a control signal, an actuator may respond by converting the source's energy into mechanical motion.

Illustrative examples in this description are for the 2D case, considering position and velocity. This is done for the sake of simplicity of the figures. The skilled person having benefit from the present disclosure will appreciate that the examples can easily be extended to a more general 3D case, where, additionally, the influence of acceleration is included.

FIG. 1 illustrates a scenario where it is not sufficient to satisfy the constraints on each of the state variables (position p, velocity v, acceleration a, and jerk) separately. In the scenario on the left of FIG. 1, an actuator faces limitations on its position p, velocity v, acceleration a, and jerk j. Hence, one cannot change the position, velocity, and acceleration instantly due to the jerk limits. Position, velocity, and acceleration all start within the actuator limits while the position p is close to its positive limit $p_{max}$ and the velocity v is positive. The value of the acceleration is less important (in fact, the same example can be crafted with negative acceleration values); more important is the fact that it cannot be changed instantly due to actuator limits on the jerk level. Given the limitations on the jerk level, one can see that it is impossible to change the sign of the velocity in time before the position p violates its upper limit $p_{max}$. The situation on the right of FIG. 1 displays a similar behavior for the scenario where there is no limit on the jerk level. And, as a result, the acceleration can be changed instantaneously.

From the examples of FIG. 1 it is clear that safe operation states for jointly considering constraints on position, velocity, and acceleration levels are smaller than for the separately considered case. An illustration of both situations can be seen in FIG. 2. The separately considered case (rectangular box) is denoted with reference numeral 22, whereas the jointly considered case is denoted with reference numeral 24.

The bounds in terms of actuator position and velocity to ensure safe operation of the system may be approximated conservatively. Instead of computing an exact (tight) set of admissible position-velocity-acceleration pairs, it is common to heuristically define a safety margin with respect to hard constraints on position and velocity level.

An approach to define a safety margin is to define a soft limit on the position and/or velocity levels, independent of the state of the actuator. In the example 2D case illustrated in FIG. 2, this means that the area 24 may be approximated by any rectangle that does not exceed the area 24; see, e.g., the rectangle 26 of FIG. 3. It is immediately obvious that a large part of the safe operational space is classified as unsafe by the rectangular approximation 26, which results in an overly restrictive operational space.

Figure 3:
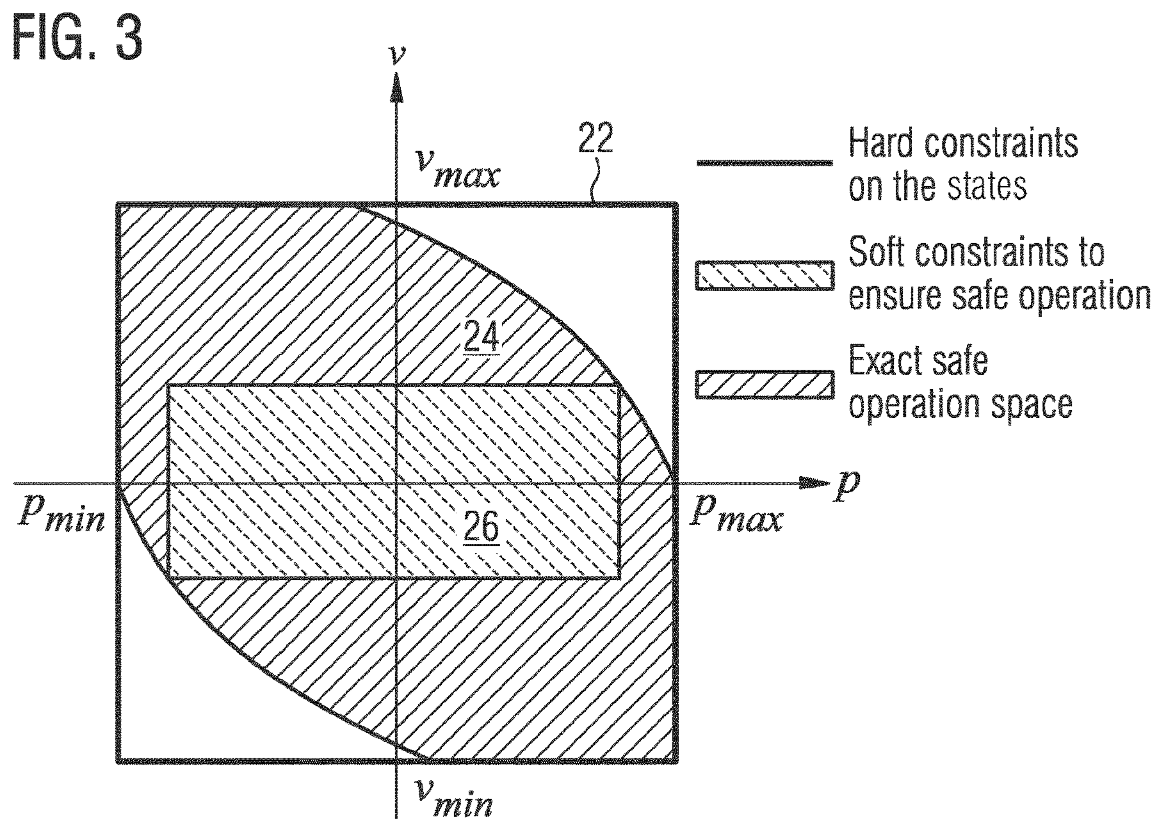
FIG. 3 illustrates a state-independent soft-constraint approach.
Figure 4:
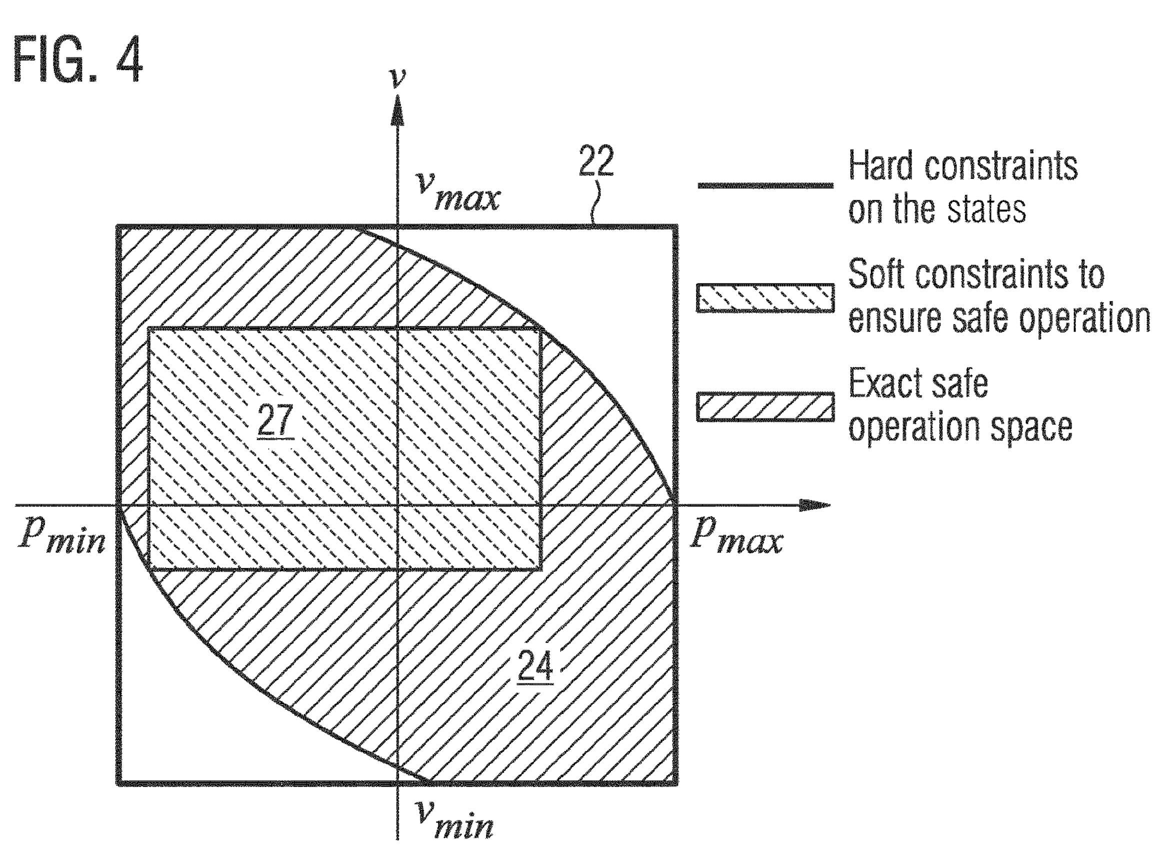
FIG. 4 illustrates an alternative, equally valid choice for the state-independent soft-constraint approach.
Figure 5:
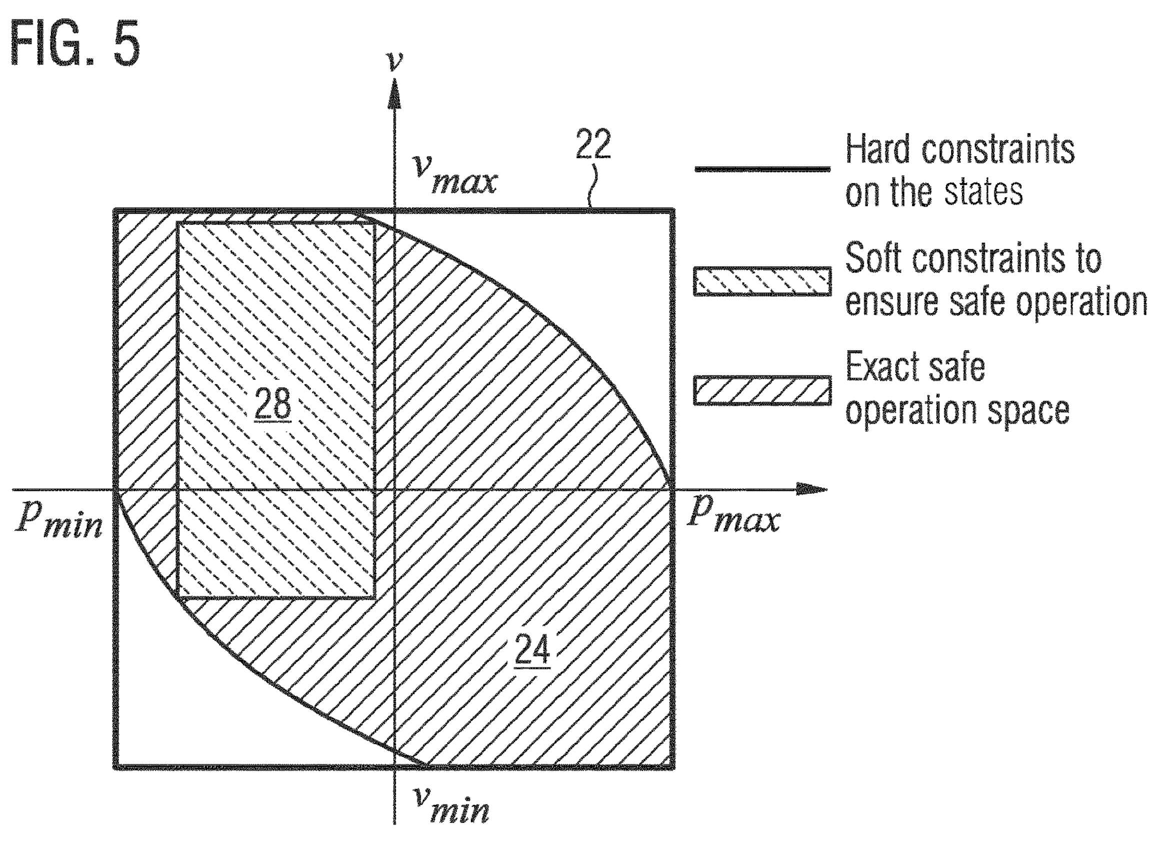
FIG. 5 illustrates an alternative, equally valid choice for the state-independent soft-constraint approach.

An additional point of concern is that the choice of the soft limits is not unique. Equally valid cases are illustrated in FIG. 4 and FIG. 5. Whether the choice in FIG. 3, FIG. 4, or FIG. 5 is better depends entirely on the application at hand and the expected operation conditions. Note that the soft actuator constraints are constant and can be read from the Figures as the upper and lower limits of the rectangles 26, 27, 28 on both axes p, v.

A slightly more sophisticated approach is to make the actuator limits dependent on the (motion) state of the actuator. An actuator control circuit may be configured to approximate "hard" operational actuator limits by only allowing the actuator to be operated up to some "soft" actuator limits. An upper (resp. lower) bound on the actuator acceleration $a_{max}$ (resp. $a_{min}$) may be computed using a measured current velocity v and an upper (lower) bound on the velocity $v_{max}$ (resp. $v_{min}$) using a heuristically tuned gain $\kappa_{vel}>0$ as $$a_{max} = -\kappa_{vel}(v - v_{max}) \tag{1}$$

$$a_{min} = -\kappa_{vel}(v - v_{min}) \tag{2}$$

Similarly, the upper (resp. lower) bound on the actuator velocity $v_{max}$ (resp. $v_{min}$) may be computed using the measured current position p and the upper (resp. lower) bound on the position $p_{max}$ (resp. $p_{min}$) using a heuristically tuned gain $\kappa_{pos}>0$ as $$v_{max} = -\kappa_{pos}(p - p_{max}) \tag{3}$$

$$v_{min} = -\kappa_{pos}(p - p_{min}) \tag{4}$$

Figure 6:
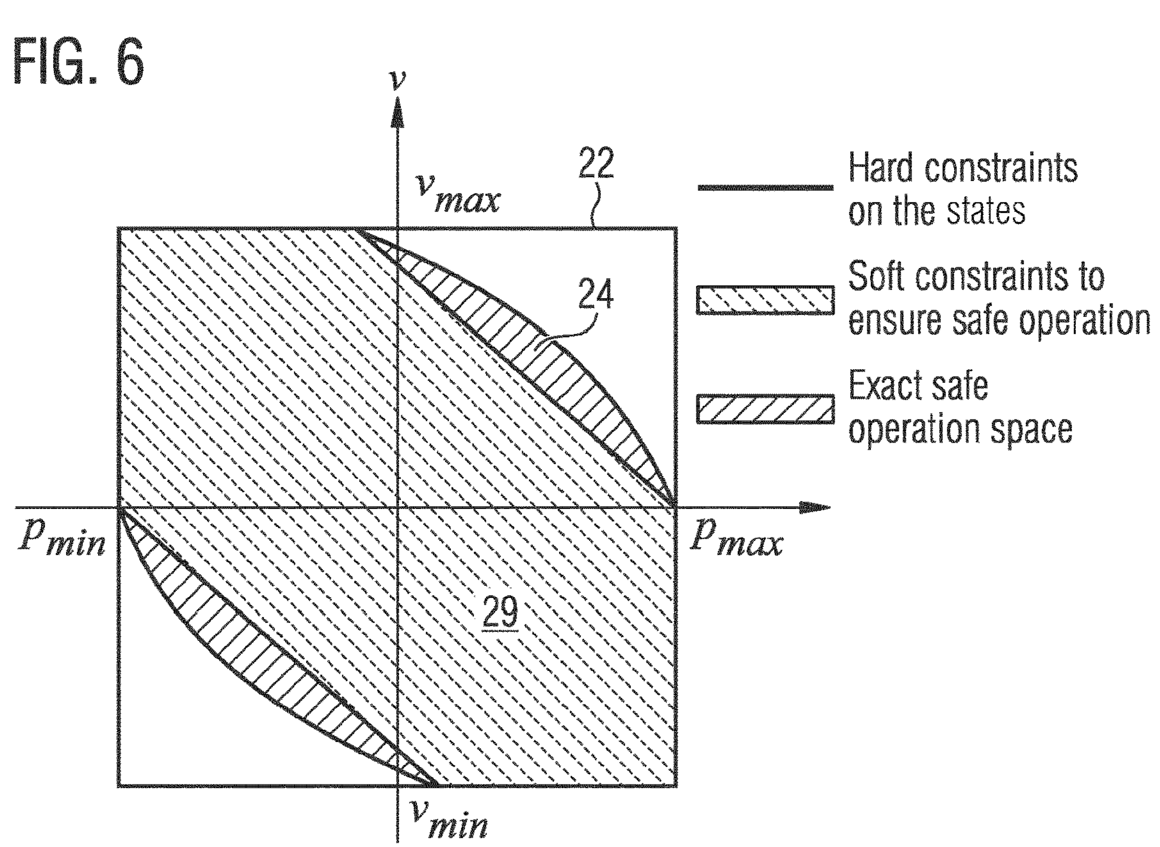
FIG. 6 shows an illustration of linear, position-dependent velocity constraint.

By limiting the acceleration and velocity this way, violation of position and velocity limits may be avoided. Clearly the above method only provides conservative soft bounds. FIG. 6 illustrates an example of a linearly, position dependent safe operational limit for the actuator velocity. For an appropriately chosen gain $\kappa_{pos}$, this results in a reasonable approximation of the safe operation space of the actuator. Nonetheless, this approach may still be overly restrictive, which can be seen by the poor coverage of the area 24 by the area 29. In the case of considering acceleration in addition to position and velocity (3D case), this approximation becomes even more restrictive.

Especially, in case of high-performance applications, losing part of the safe operation space 24 due to having tighter than necessary actuator limits is undesirable. Furthermore, the method requires to carefully pick the gain variable κ, making it unsuitable for automatic calculation of the limits. Finally, the jerk limits of robot actuators (e.g., robot arms) are not taken into account in the problem, which is especially problematic for systems with low jerk limits.

Figure 7:
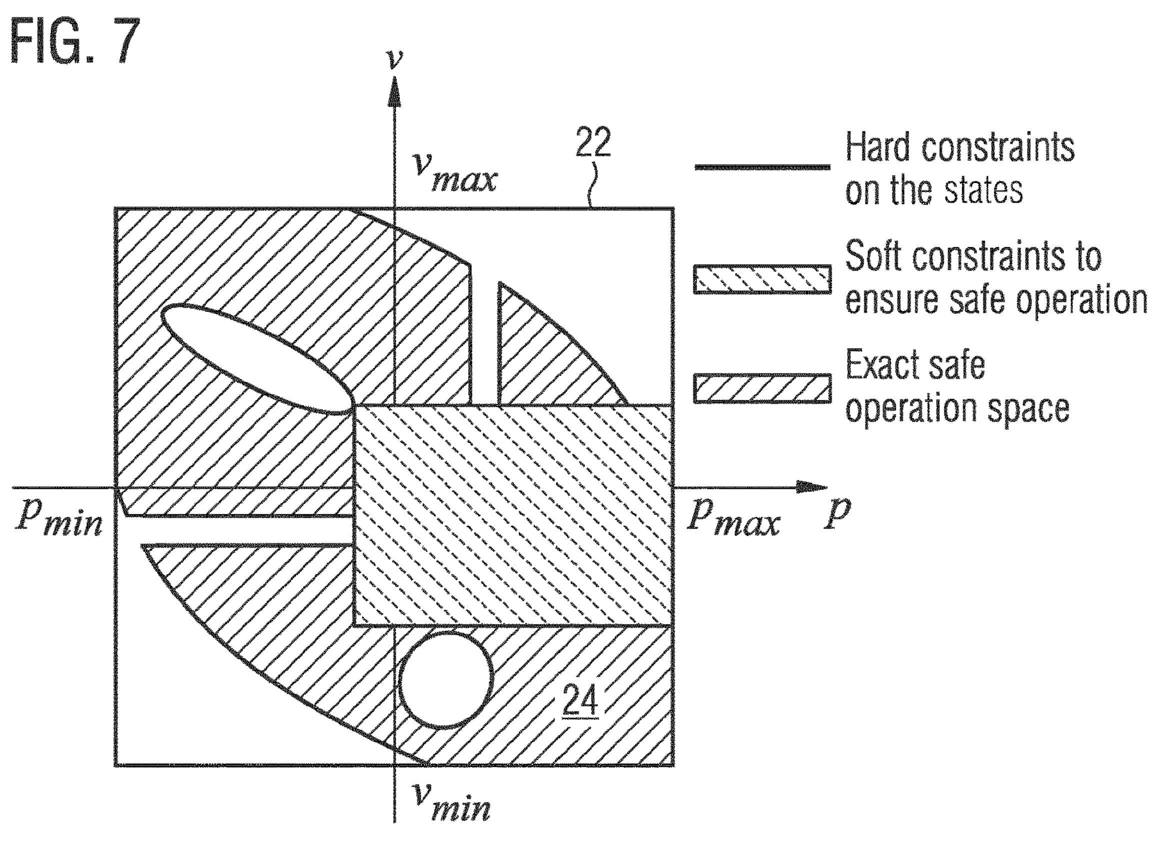
FIG. 7 shows an example of a general scenario for actuator position and velocity limits.

In the more general case of state and/or time-dependent actuator limits, e.g. $\{p_{min}, p_{max}\}=f_{pos}(p, v, a, t)$ and $\{v_{min}, v_{max}\}=f_{vel}(p, v, a, t)$, the linear approach described above cannot be applied. As an example, in the scenario in FIG. 7, any simple linear approximation of the safe operation space 24 is clearly overly restrictive. Such general case might seem far-fetched; however, this is a commonly occurring situation when considering actuators that are operated in a system rather than as a standalone unit or actuators operating in complex environments with obstacles.

The present disclosure proposes a concept for calculating an exact representation of safe operational states of an actuator, in terms of its position, velocity and acceleration and with a known jerk limit of the of the actuator, and controlling the actuator (e.g., robot arm) to stay within the safe operational states. Although visualizations used in this disclosure are limited to constant motion state constraints, the proposed concept is valid for the most general setting where the limits dynamically change.

The proposed concept assumes knowledge on the actuator limits in terms of position, velocity, acceleration, and jerk. The idea is to determine whether there exists a jerk trajectory j(t) that ensures constraint satisfaction at all future times for all possible states of the actuator. This corresponds to the safe operation space 24.

Figure 8:
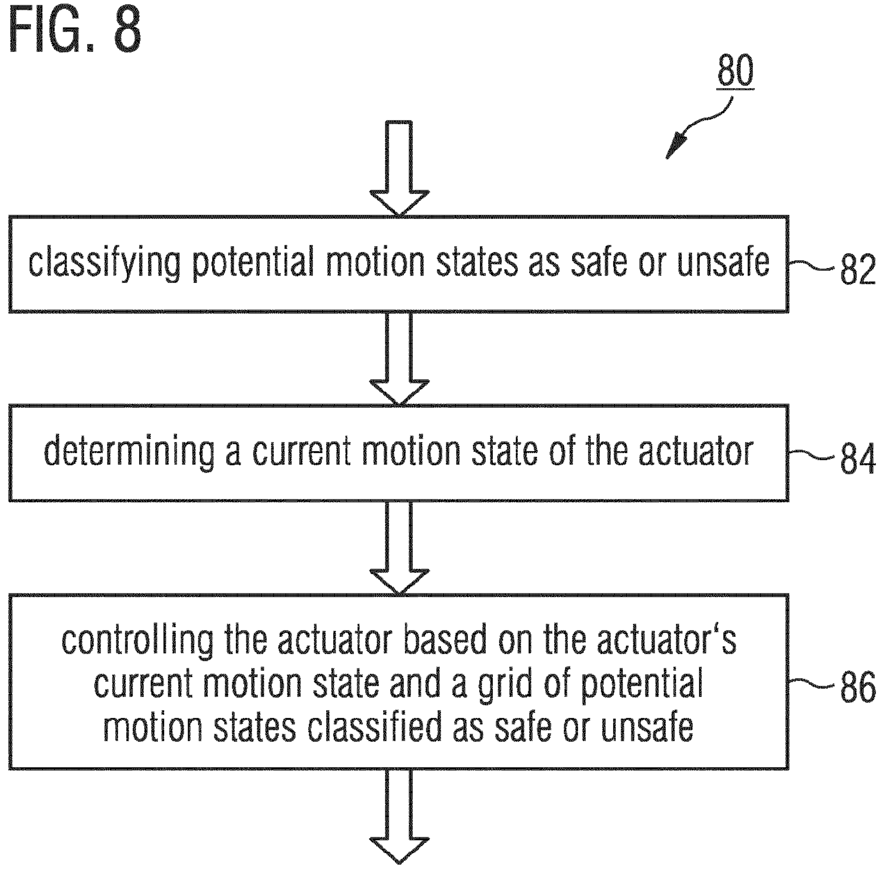
FIG. 8 shows a flowchart of a method for controlling an actuator according to an embodiment.

A flowchart of the proposed method 80 for controlling an actuator is illustrated in FIG. 8. The skilled person having benefit from the present disclosure will appreciate that method 80 can be computer-implemented and thus can be executed on actuator control circuitry based on sensor data, for example.

Method 80 includes classifying 82 potential motion states located within motion limits of the actuator as safe or unsafe based on one or more potential motion trajectories and motion state constraints. Method 800 further includes determining 84 a current motion state of the actuator. For example, this can be done using a motion sensor. Method 80 further includes controlling 86 the actuator based on the actuator's current motion state and a grid of potential motion states classified as safe or unsafe. Controlling the actuator can be done by issuing analog and/or digital control commands to an actuator motor, for example.

Figure 9:
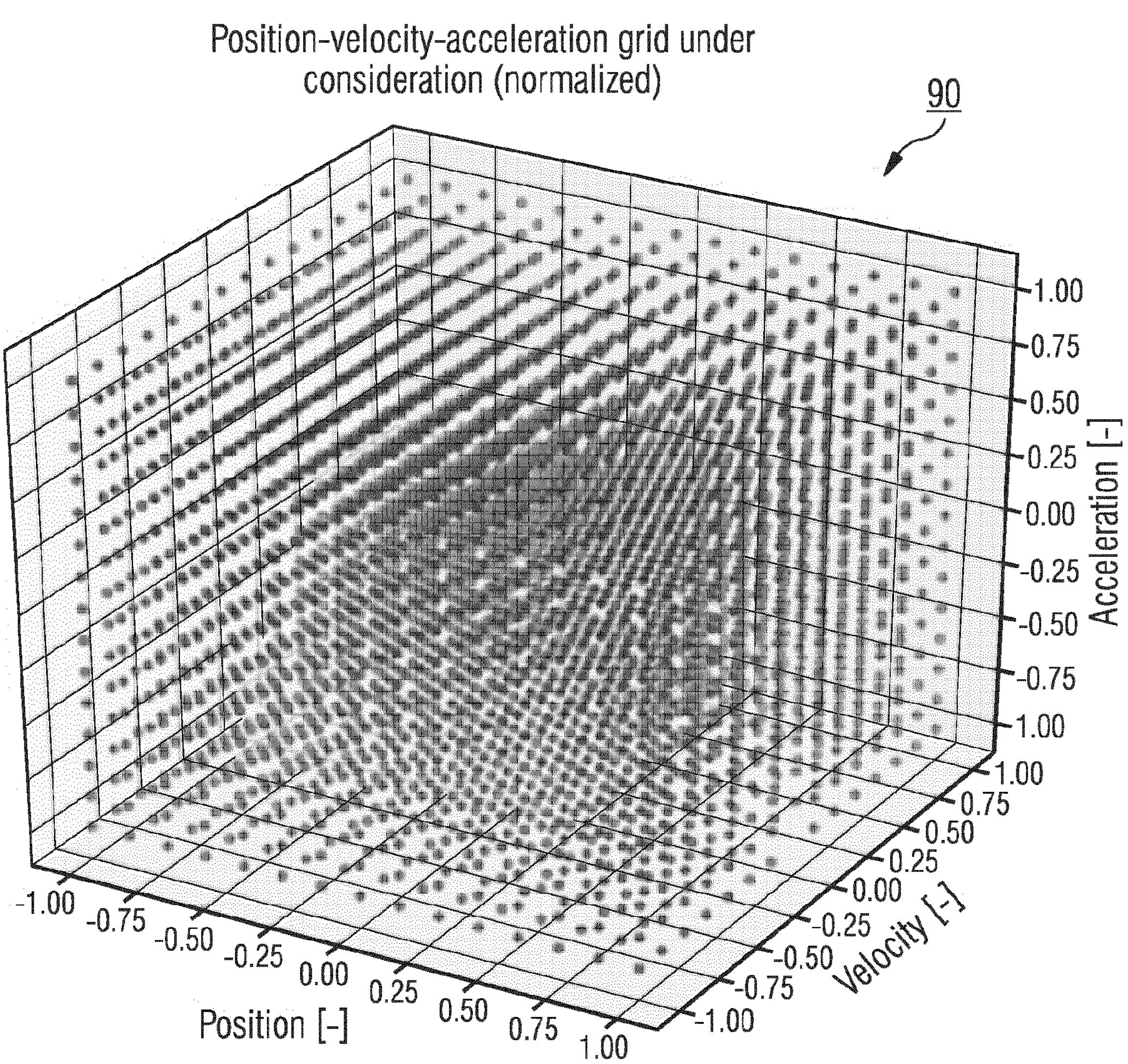
FIG. 9 shows an example grid of potential motion states located within motion limits of the actuator.
Figure 10:
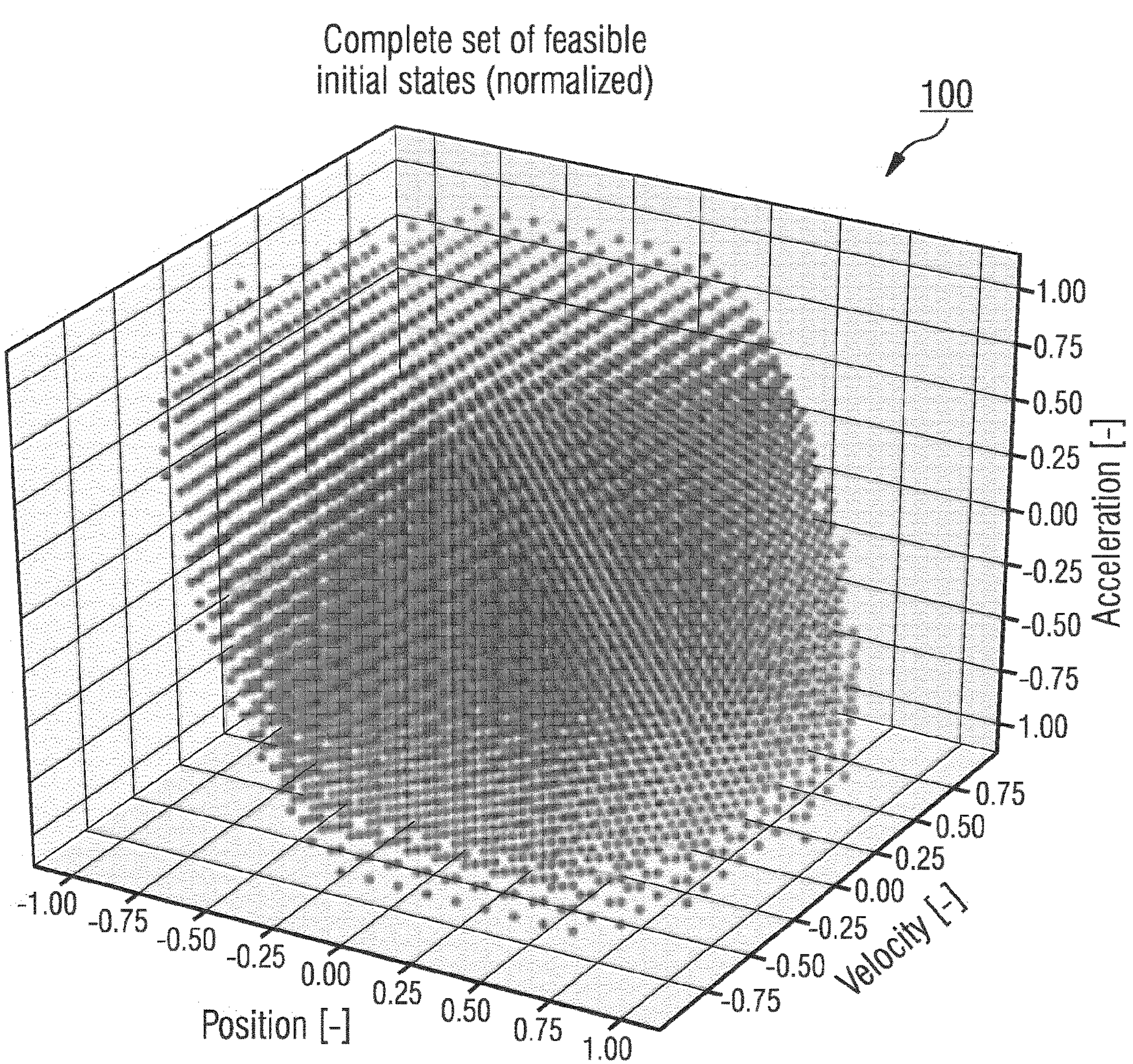
FIG. 10 shows an example grid of safe motion states.

The individual acts of method 80 will be explained in more detail below. Act 82 of classifying potential motion states may include determining a grid of initial motion states located within the motion limits of the actuator. An example of a grid 90 of initial motion states is shown in FIG. 9. Grid 90 may be a 3D grid of position-velocity-acceleration pairs located within the actuator position, velocity, and acceleration limits, i.e. position$\in[p_{min}, p_{max}]$, velocity$\in[v_{min}, v_{max}]$, acceleration$\in[a_{min}, a_{max}]$. A resolution of the grid 90 can be chosen freely, but it may be advised to make it as fine as computational budget allows. Every grid point of grid 90 represents a potential initial motion state. There may be I potential initial motion states. For each initial motion state (i.e., each grid point) i ($1 \le i \le I$) of the grid 90, it may be determined whether there exists a feasible jerk or jerk trajectory j(t) (within jerk limits) that satisfies motion constraints on position, velocity, and acceleration. If such a jerk trajectory is found, the initial motion state i under consideration may be classified as a safe motion state, otherwise it may be classified as unsafe. Unsafe motion states may be canceled from the grid 90, leading to a grid 100 of feasible (initial) motion states as shown in FIG. 10.

There are several methods to determine whether the j(t) trajectory exists. A preferred method may depend on the level of complexity of the constraints. A schematic of a proposed method 110 can be found in FIG. 11.

Method 110 of FIG. 11 starts with a definition 112 of the initial 3D grid 90 of all position-velocity-acceleration pairs located within the actuator position, velocity, and acceleration limits. Then, in act 122, an iterative process 120 for the i-th grid point i (pi, vi, ai) under consideration is initiated. In act 124, initial motion conditions are set for the i-th grid point i (pi, vi, ai) in accordance with p[0]=pi, v[0]=vi, and a[0]=ai. Thus, initial conditions of the motion profile may be set equal to the grid point currently under consideration (the so-called "initial state"). In act 126, starting from the initial state defined in 124, it is determined whether there exists a j(t) that satisfies all state constraints on position, velocity, and acceleration level. If such a jerk signal j(t) can be found, the i-th grid point may be labelled as a safe state in act 128, otherwise it may be labelled as unsafe. After completion of iterative process 120, method 110 yields a set of safe states 130 and the grid 100 of feasible initial motion states.

In the most general case, the motion state constraints may be a function of the motion state and time:

$$\{p_{min}, p_{max}\} = f_{pos}(p, v, a, t) \quad (1)$$

$$\{v_{min}, v_{max}\} = f_{vel}(p, v, a, t) \quad (2)$$

$$\{a_{min}, a_{max}\} = f_{acc}(p, v, a, t) \quad (3)$$

$$\{j_{min}, j_{max}\} = f_{jer}(p, v, a, t) \quad (4)$$

Note that functions $f_{pos}(\bullet)$, $f_{vel}(\bullet)$, $f_{acc}(\bullet)$, $f_{jer}(\bullet)$ may be arbitrary sets. For such a scenario, there is no straightforward computation method for determining whether a certain motion state is safe or not. According to some embodiments, this problem may be phrased as a constrained optimization problem. Existing tools, such as linear programming, non-linear programming, quadratic programming, etc., may be used to determine whether constraint violation can be avoided in future motion states or not.

In order to solve this problem, the problem formulation may be discretized. It may be started by choosing a sufficiently small discretization time step Δt. The skilled person having benefit from the present disclosure will appreciate that the choice of Δt may be dependent on the actuator and/or the application under consideration. Position, velocity, and acceleration may be computed from the jerk j[k] by integration as follows:

$$p[k+1] = p[k] + v[k]\cdot\Delta t + \frac{1}{2}\cdot a[k]\cdot\Delta t^2 + \frac{1}{6}\cdot j[k]\cdot\Delta t^3 \quad (5)$$

$$v[k+1] = v[k] + a[k]\cdot\Delta t + \frac{1}{2}\cdot j[k]\cdot\Delta t^2 \quad (6)$$

$$a[k+1] = a[k] + j[k]\cdot\Delta t \quad (7)$$

with $$p[0] = p_i \quad (8)$$

$$v[0] = v_i \quad (9)$$

$$a[0] = a_i \quad (10)$$

as defined by the i-th grid point under consideration. The motion state constraints need to be satisfied, i.e., $$p[k] \in [p_{min}, p_{max}] \quad (11)$$

$$v[k] \in [v_{min}, v_{max}] \quad (12)$$

$$a[k] \in [a_{min}, a_{max}] \quad (13)$$

$$j[k] \in [j_{min}, j_{max}] \quad (14)$$

for all discretization steps k∈[0, ∞[. However, this problem is intractable for an infinite horizon. For this reason, it is proposed to stop at some final time T=k·Δt (T again as small as possible), for which it can be guaranteed that $$p_{min} < p[k] < p_{max} \text{ and } v_{min} < v[k] < v_{max} \quad \forall\, k\Delta t \in [0, T], \quad (15)$$

which implies $$p_{min} < p[k] < p_{max} \text{ and } v_{min} < v[k] < v_{max} \quad \forall\, k\Delta t \in T, \infty[. \quad (16)$$

Now T can be estimated conservatively by computing the shortest time in which it can be gone from any initial actuator motion state to any final actuator motion state within the constraints, and taking the highest value obtained for all these initial-final state pairs. Clever tricks to easily find this time T may exist, but this depends entirely on the state constraints. Choosing a too small value for T might result in labeling an unsafe state as safe due to constraint violation beyond the considered time frame.

A more straightforward case is when all the actuator state constraints are constant (not time variant). Starting from the initial state defined in act 112, we aim to find j(t) that results in a time-optimum motion from the specified initial state $[p_i, v_i, a_i]$ (the i-th grid point under consideration) to a final state at time T, from which we can guarantee $\exists$j(t): $p_{min}<p(t)<p_{max}$, $v_{min}<v(t)<v_{max}$ $\forall t>T$. A simple example of a valid state at time T is any state for which v(T)=a(T)=0 (since this is a stationary state).

When both $$\exists\, j(t)\colon p_{min} < p(t) < p_{max}, \quad v_{min} < v(t) < v_{max} \quad \forall\, t < T \tag{17}$$

$$v(T) = a(T) = 0 \tag{18}$$

are satisfied, this implies that $$\exists\, j(t)\colon p_{min} < p(t) < p_{max}, \quad v_{min} < v(t) < v_{max} \quad \forall\, t > T \tag{19}$$

An example of such j(t) would be $j(t)=0\forall t>T$, since this implies that p(t)=p(T), v(t)=v(T), $a(t)=a(T)\forall t>T$. Note that j(t) is chosen to ensure $a_{min}<a(t)<a_{max}\forall t$. Note that $v_{max}$ may always be positive and $v_{min}$ may always be negative. On the other hand, $p_{max}$ and $p_{min}$ can potentially have the same sign.

To achieve minimal time motion from p[0], v [0], a[0] to v(T)=a(T)=0, the jerk j(t) may always be taken as $j(t)\in\{j_{min}, j_{max}, 0\}$. This means that the jerk j(t) may be selected from minimum jerk, maximum jerk, or zero jerk. This follows from well-known solutions from optimal control theory.

The input j[k] may be chosen to satisfy the above requirements. Position, velocity, and acceleration profiles may be derived from j[k] as described above. Then it can be checked whether $$p_{min} < p[k] < p_{max}, \quad v_{min} < v[k] < v_{max} \quad \forall\, k < \frac{T}{\Delta t}.$$

If this is the case, the i-th grid point under consideration may be labeled as a safe state. If not, it may be labeled as an unsafe state.

The method in the absence of a jerk actuator limit is analogous to the one described above, with the sole difference that the acceleration can be changed instantaneously.

Alternative to the embodiment presented above, one could phrase the optimization problem as a quadratic program (QP) and solve it using standard methods. The jerk inputs at discrete time instants [0], [1], . . . , [K] can be represented as a vector of size K as follows:

$$j = \begin{bmatrix} j[0] \\ \vdots \\ j[K-1] \end{bmatrix} \in \mathbb{R}^K \tag{20}$$

The acceleration, the velocity, and the position vectors are linear transformations of the jerk vector defined as:

$$a = \underbrace{a[0]\cdot\mathbb{1}}_{r_{acc}} + \underbrace{\Delta t\cdot S}_{A_{acc}}\cdot j, \tag{21}$$

$$v = \underbrace{v[0]\cdot\mathbb{1} + a[0]\cdot\Delta t\cdot S\cdot\mathbb{1}}_{r_{vel}} + \underbrace{\Delta t^2\cdot S\cdot\left(\frac{1}{2}S + I\right)}_{A_{vel}}\cdot j, \tag{22}$$

$$p = \underbrace{p[0]\cdot\mathbb{1} + v[0]\cdot\Delta t\cdot S\cdot\mathbb{1} + \frac{1}{2}a[0]\cdot\Delta t^2\cdot S + a[0]\cdot\Delta t^2\cdot S\cdot S\cdot\mathbb{1}}_{r_{pos}} + \underbrace{\Delta t^3\cdot\left(S\cdot S + S + \frac{1}{6}I\right)\cdot S}_{A_{pos}}\cdot j, \tag{23}$$

where $S\in\mathbb{R}^{K\times K}$ is can be derived from Equations 5, 6, and 7 and $\mathbb{1}=[1, \ldots 1]\in\mathbb{R}^K$.

The act 126 of determining whether there exists a jerk trajectory that satisfies all state constraints may comprise minimizing a sum of the squared norm of the velocity vectors $r_{vel}$ and $A_{vel}$ j and the squared norm of the acceleration vectors $r_{acc}$ and $A_{acc}$ j. This may be subject to constraints.

In particular, one may aim at finding the jerk vector j that minimizes $\|r_{vel}+A_{vel}\, j\|^2+\|r_{acc}+A_{acc}\, j\|^2$, while respecting all the constraints. Putting all together, this task can be formulated in terms of quadratic programming $$\text{minimize}_{j\in\mathbb{R}^K} \|r_{vel} + A_{vel} j\|^2 + \|r_{acc} + A_{acc} j\|^2 \tag{28}$$

$$\text{s.t.}\quad \begin{cases} j_{min} \le j \le j_{max} \\ a_{min} \le r_{acc} + A_{acc} j \le a_{max} \\ v_{min} \le r_{vel} + A_{vel} j \le v_{max} \\ p_{min} \le r_{pos} + A_{pos} j \le p_{max} \end{cases}$$

If the feasible space is nonempty for a sufficiently large K, the solution to the above problem exits and it is unique. Otherwise, the initial condition/state $[p_0, v_0, a_0]$ may be deemed unsafe.

In a more general setting where the motion limits may dynamically change, the problem may be formulated in terms of quadratically-constrained quadratic programming or conic quadratic programming, depending on the model chosen for the limits. The focus when solving the optimization problems is not to find a solution for j[k], rather it may be aimed at finding whether constraint satisfaction until time T can be achieved or not.

Example: Ellipsoid State Constraint

The problem can be formulated as a quadratically constrained quadratic program (QCQP). If all are positive semi-definite, the feasible set is convex and the problem is relatively easy to solve. If not, QCQP becomes very hard to solve.

After following the method proposed above, a description of the safe operation states for the actuator under consideration results. This set may be used as follows 1. At a sample rate at which the actuator is controlled, a current motion state may be read/estimated from motion sensors.
2. Using the set 100 of safe operation states, we determine whether the current and the desired state are safe or not.
3. One of the following two scenarios may happen:
   a. The motion state is labeled as safe. Nothing happens.
   b. The motion state is labeled as unsafe. Some pre-defined safety procedure (possibly state-dependent) may be executed to avoid constraint violation in the future.

Making the binary decision safe/unsafe in step 2 may be done by using a classifier trained for this task. In the case of constant state constraints, the safe operation space is convex, which makes it possible to use efficient classifiers that distinguish between points inside and outside a convex hull of safe operation states. In the general case, a binary classifier may be used. Some possibilities are given by but not limited to decision trees, random forests, Bayesian networks, support vector machines, neural networks, etc. The above procedure is summarized in FIG. 12.

Figure 12:
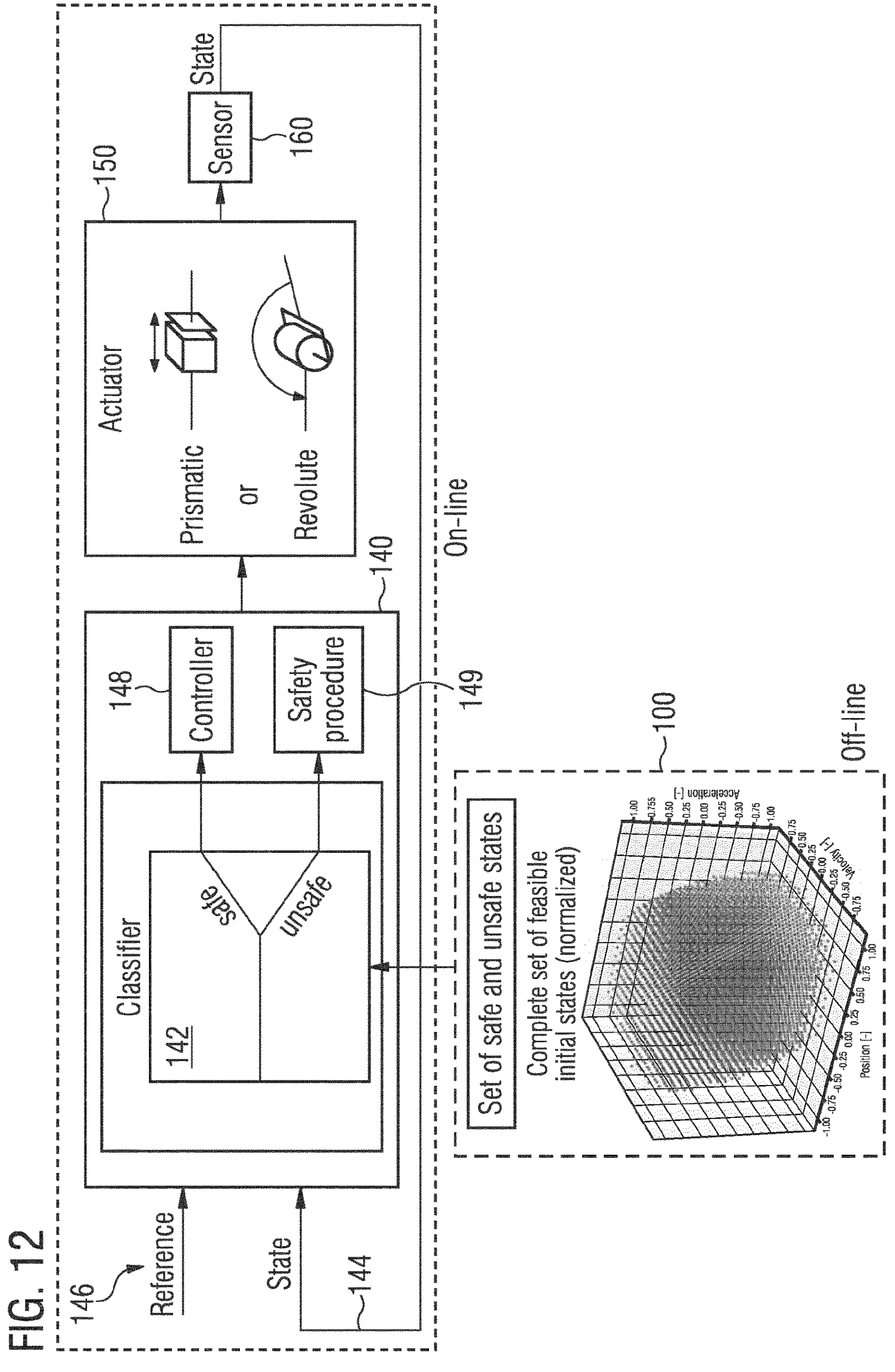
FIG. 12 illustrates an example of an implementation of the proposed concept.

FIG. 12 shows an embodiment of an apparatus 140 for controlling an actuator 150. The apparatus 140 comprises classifier circuitry 142 which is configured to classify motion states 144 of the actuator 150 as safe or unsafe. Classifier circuitry 142 comprises inputs for a target motion state 146 (reference) and a current (measured) motion state 144 of the actuator 150. The actuator's current motion state 144 may be read/estimated from motion sensors 160. Classifier circuitry 142 is configured to determine whether the current state 144 and/or the target state 146 are safe or not. For this purpose, classifier circuitry 142 may be configured to compare the current state 144 and/or the target state 146 against the grid 100 of motion states classified as safe (safe operation space) to determine whether the current state 144 and/or the target state 146 are safe or not. Classifier circuitry 142 may be trained using the safe operation space 100. In the case of constant state constraints, the safe operation space 100 is convex, which makes it possible to use efficient classifiers that distinguish between points inside and outside a convex hull of safe operation states. In the general case, a binary classifier may be used in classifier circuitry 142. Some possibilities for classifier circuitry 142 are given by but not limited to decision trees, random forests, Bayesian networks, support vector machines, neural networks.

The apparatus 140 further comprises control circuitry 148 configured to control the actuator 150 based on an output of classifier circuitry 142. If the current motion state 144 and the target state 146 have been classified as safe, control circuitry 148 may control the actuator 150 to reach the target state as next motion state. If the current motion state 144 and/or the target state 146 have been classified as unsafe, a pre-defined safety procedure 149 may be executed to avoid constraint violation.

As an optional extension, the classifier circuitry 142 could be used in combination with a predictor. The idea is to approximate a future state of the actuator with a function that takes as input one or more previous measured states 114 and optionally an applied control signal. In this case, the classifier circuitry 142 can be used to find actuator commands that lead to safe motion states. FIG. 13 illustrates the proposed setup, where apparatus 140 further comprises predictor circuitry 141 configured to determine a predicted next motion state based on the previously and/or currently measured motion states 144 and a control signal 145. The reference signal 146 is the target state, the control signal 145 is the output of the controller 148 (sent to the actuator 150) that is used to bring the system from current to reference state. Classifier circuitry 142 is configured to classify the predicted next motion state and/or the current motion state of the actuator 150 as safe or unsafe. Alternatively, the predictor 141 could be included in an augmented classifier that takes the current state (i.e., signal 145) and the next command as input.

Figure 14:
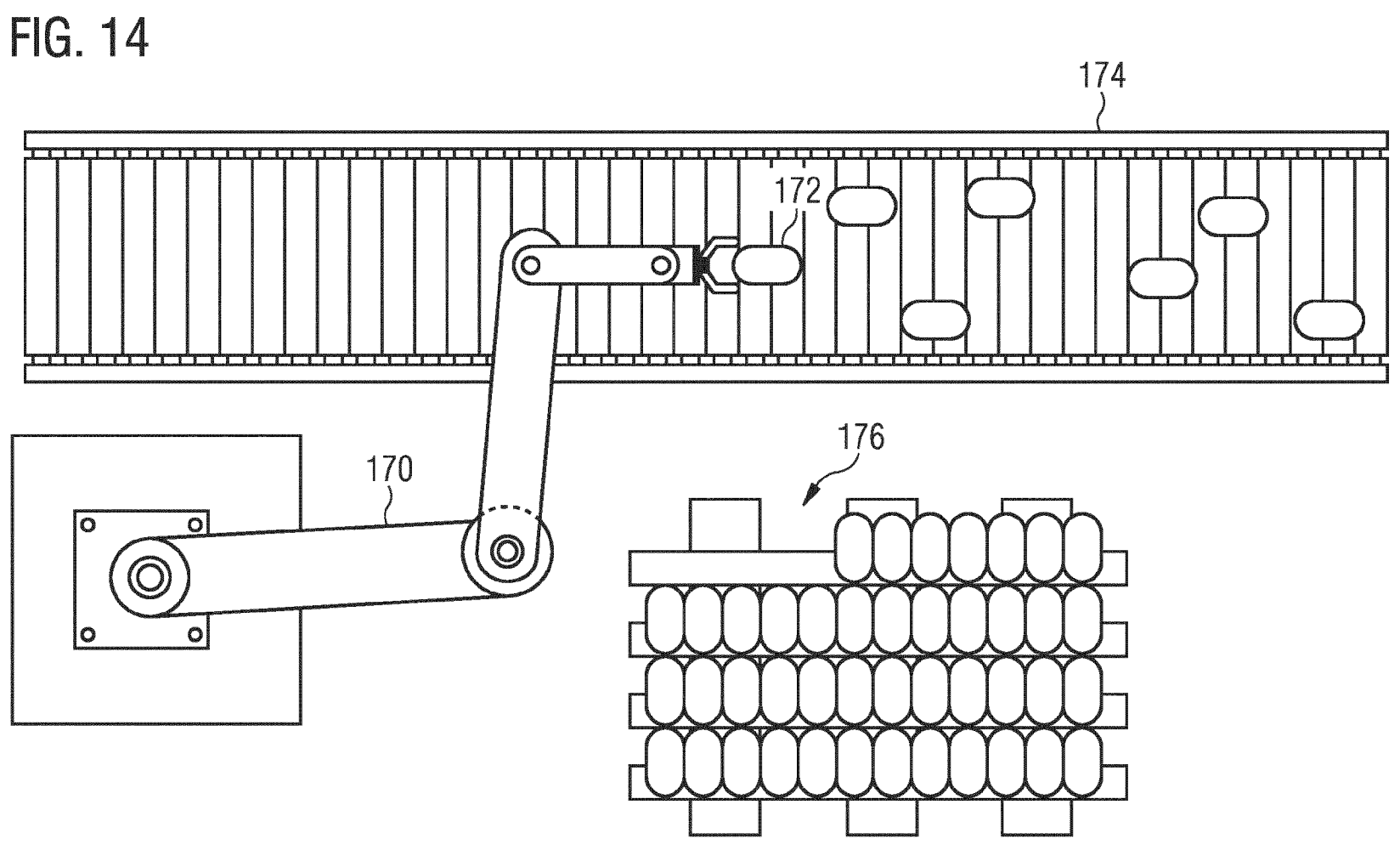

To give more context to the proposed concept, a potential use case in an example application is illustrated in FIGS. 14 and 15.

Consider an N degree of freedom industrial robot arm 170 used in a dynamic pick-and-place scenario. The task of the robot arm 170 is to move towards an object 172 that is moving on a conveyor belt 174, securely pick up the object 172, and place it at a target location 176. In order to ensure a secure grasp, the robot arm 170 needs to meet the object 172 at an intercept point, match its speed with that of the object 172, and pick it up while moving along with the conveyor belt 174.

The schematic in FIG. 15 provides an overview of the information flow in the system and the required components. perception system and external sensors 180 give information of the state of the system and its environment, i.e., the robot 170 and the item 172 to be picked up from the conveyor belt 174. Sensors 160 on the actuators of the robot provide additional information of the state of the robot 170. A high-level motion planning algorithm 190 may decide what robot motion should be executed to achieve a certain desired performance target, in the illustrated example the performance of picking up the object 172 from the moving conveyor belt 174 and moving it to a target location 176. This desired motion 146 might however not be safe for the robot to follow, due to violation of constraints on position, velocity, acceleration and/or jerk. This is where the safety mechanism described herein comes in. The desired robot motion 146 is classified as either safe or unsafe by classifier 142. As was presented before, the desired robot motion 146 may either be considered safe and may be fed through to a low-level motion planner 195, or considered unsafe, which may trigger safety procedure 149. Safe robot motion may be passed to the low-level motion planner 195 which may convert the desired robot motion into appropriate control signals for the robot's actuators. Note that due to the safety protocol in the control loop, these actuator commands may always be safe to be executed. The motion of the actuators may cause the robotic system 170 to move to a new (motion) state, which finalizes the control loop.

Figure 16:
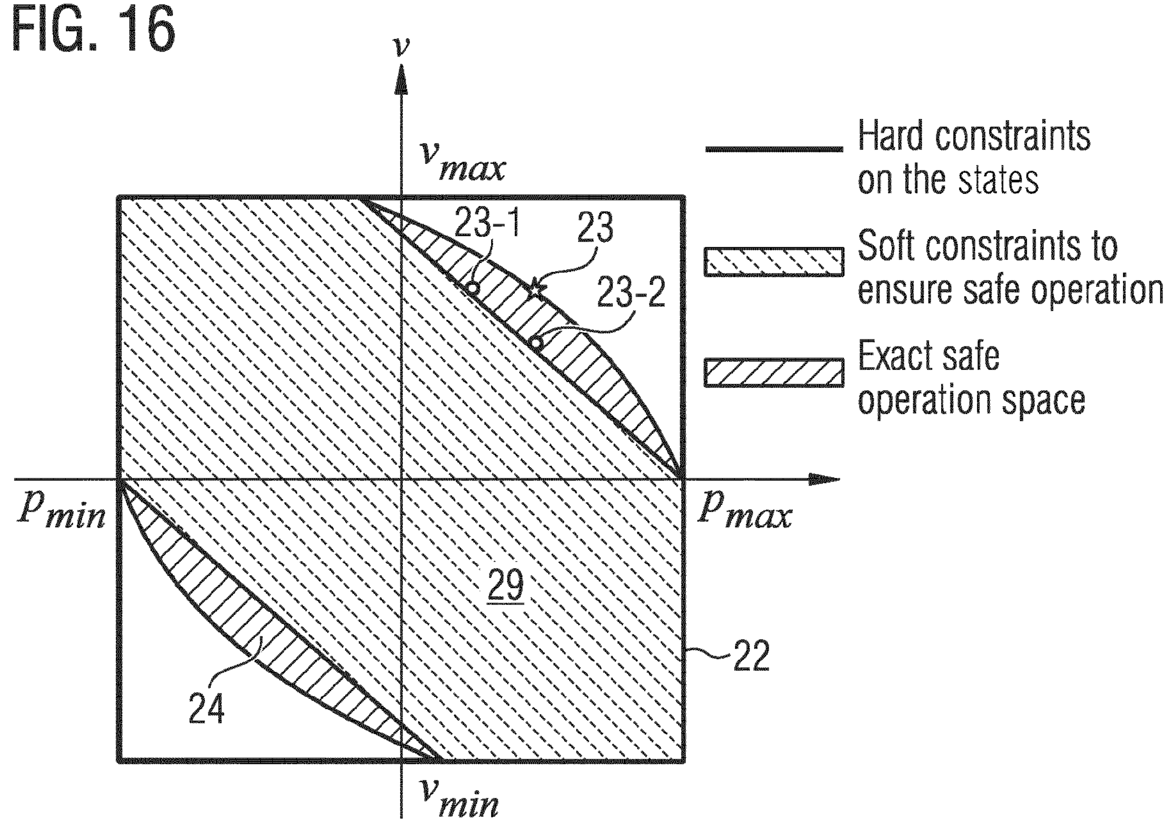
FIG. 16 illustrates a loss of performance incurred by conventional methods when ensuring safe operation of the example use case.

When using state-of-the-art methods, the conveyor belt 174 must be slowed down to an appropriate speed in case the object 172 moves too fast for the robot 170 to pick it up while satisfying its dynamic constraints on e.g. acceleration and jerk level. This obviously decreases the throughput of the system. More concretely, consider the safe operation set as shown in FIG. 16. Assume that the object position and velocity require one of the actuators to be operated in state 23. This is not a safe state according to the conventional set 29 of safe operation states. We need to project state 23 onto the area 29 (two possibilities are indicated with dots 23-1, 23-2) to ensure safe operation of the system. For the approach proposed herein, where we have an exact representation of the set of safe states (area 24), this is not the case. This results in a higher achievable performance, while avoiding constraint violation, thus improving the lifetime of the robot.

Note that the present technology can also be configured as described below.

Example 1 is a method for classifying and/or controlling motion of an actuator. The method comprises classifying potential motion states located within motion limits of the actuator as safe or unsafe based on one or more potential motion trajectories and motion state constraints. The method comprises determining a current motion state of the actuator. The method comprises controlling the actuator based on the actuator's current motion state and a grid of potential motion states classified as safe or unsafe.

In Example 2, classifying potential motion states of Example 1 comprises determining a grid of initial motion states located within the motion limits of the actuator. For each initial motion state of the grid, it may be determined whether there exists a feasible jerk trajectory that satisfies motion constraints on position, velocity, and acceleration. If such a jerk trajectory is found, the initial motion state under consideration may be classified as a safe motion state, otherwise it may be classified as unsafe.

In Example 3, determining the grid of initial motion states of Example 2 comprises determining position-velocity-acceleration triplets located within current actuator position, velocity, and acceleration limits, wherein position$\in[p_{min}, p_{max}]$, velocity$\in[v_{min}, v_{max}]$, and accelation$\in[a_{min}, a_{max}]$.

In Example 4, acceleration, velocity, and jerk trajectories of Example 3 are computed for each initial motion state of the grid by integrating their respective higher order derivatives.

In Example 5, the jerk trajectory of any one of Examples 2 to 4 at time k is j[k] and p[0], v[0], a[0] defines an initial motion state within the grid, and wherein an acceleration of the actuator at time k+1 is computed according to $a[k+1]=a[k]+j[k]\cdot\Delta t$, a velocity of the actuator at time k+1 is computed according to $$v[k+1]=v[k]+a[k]\cdot\Delta t+\frac{1}{2}\cdot j[k]\cdot\Delta t^2,$$

and a position of the actuator at time k+1 is computed according to $$p[k+1]=p[k]+v[k]\cdot\Delta t+\frac{1}{2}\cdot a[k]\cdot\Delta t^2+\frac{1}{6}\cdot j[k]\cdot\Delta t^3.$$

In Example 6, determining whether there exists a jerk trajectory that satisfies the state constraints comprises of Example 5 determining whether the jerk trajectory at time k is within jerk limits, the acceleration trajectory at time k is within acceleration limits, the velocity trajectory at time k is within velocity limits, and the position trajectory at time k is within position limits.

In Example 7, determining whether there exists a jerk trajectory that satisfies the state constraints of any one of Examples 2 to 6 comprises determining whether there exists a jerk trajectory from an initial state of the initial grid that satisfies state constraints up to a terminal time.

In Example 8, determining whether there exists a jerk trajectory that satisfies the state constraints of Example 7 comprises determining a jerk trajectory that results in a time-optimum motion from an initial state of the initial grid to a final state at the terminal time.

In Example 9, the final state of Example 8 at final time T satisfies v(T)=a(T)=0.

In Example 10, the jerk trajectory at time k of any one of the Example 2 to 9 is determined according to $j[k]\in\{j_{min}, j_{max}, 0\}$.

In Example 11, the jerk trajectory at time k of any one of the Example 2 to 10 from k=0 to k=K−1 is represented as $$j=\begin{bmatrix} j[0] \\ \vdots \\ j[K-1] \end{bmatrix}\in\mathbb{R}^K,$$

the acceleration trajectory from k=0 to k=K−1 is represented as $$a=\underbrace{a[0]\cdot\mathbb{1}}_{r_{acc}}+\underbrace{\Delta t\cdot S}_{A_{acc}}\cdot j,$$

the velocity trajectory from k=0 to k=K−1 is represented as $$v=\underbrace{v[0]\cdot\mathbb{1}+a[0]\cdot\Delta t\cdot S\cdot\mathbb{1}}_{r_{vel}}+\underbrace{\Delta t^2\cdot S\cdot\left(\frac{1}{2}S+I\right)}_{A_{vel}}\cdot j,$$

the position trajectory from k=0 to k=K−1 is represented as $$p=\underbrace{p[0]\cdot\mathbb{1}+v[0]\cdot\Delta t\cdot S\cdot\mathbb{1}+\frac{1}{2}a[0]\cdot\Delta t^2\cdot S+a[0]\cdot\Delta t^2\cdot S\cdot S\cdot\mathbb{1}}_{r_{pos}}+\underbrace{\Delta t^3\cdot\left(S\cdot S+S+\frac{1}{6}I\right)\cdot S}_{A_{pos}}\cdot j,$$

wherein $S\in\mathbb{R}^{K\times K}$ is based on $$a[k+1]=a[k]+j[k]\cdot\Delta t,$$

$$v[k+1]=v[k]+a[k]\cdot\Delta t+\frac{1}{2}\cdot j[k]\cdot\Delta t^2,\text{ and }p[k+1]=p[k]+v[k]\cdot\Delta t+\frac{1}{2}\cdot a[k]\cdot\Delta t^2+\frac{1}{6}\cdot j[k]\cdot\Delta t^3\text{ and }\mathbb{1}=[1,\ldots,1]\in\mathbb{R}^K.$$

In Example 12, determining whether there exists a jerk trajectory that satisfies all state constraints of Example 11 comprises minimizing $\|r_{vel}+A_{vel}j\|^2+\|r_{acc}+A_{acc}j\|^2$.

In Example 13, determining whether there exists a jerk trajectory that satisfies all state constraints of Example 12 is based on $\text{minimize}_{j\in\mathbb{R}^K}\|r_{vel}+A_{vel}j\|^2+\|r_{acc}+$ $$A_{acc}j\|^2\quad\text{s.t.}\begin{cases} j_{min}\le j\le j_{max} \\ a_{min}\le r_{acc}+A_{acc}j\le a_{max} \\ v_{min}\le r_{vel}+A_{vel}j\le v_{max} \\ p_{min}\le r_{pos}+A_{pos}j\le p_{max} \end{cases}.$$

In Example 14, determining whether there exists a jerk trajectory that satisfies motion state constraints of any one of Examples 2 to 13 comprises using a quadratically-constrained quadratic programming or conic quadratic programming algorithm.

In Example 15, determining the actuator's current motion state of any one of Examples 1 to 14 comprises estimating, using one or more motion sensors, the actuator's current motion state.

In Example 16, determining the actuator's current motion state of any one of Examples 1 to 15 comprises predicting the current motion state based on one or more previous motions states.

In Example 17, controlling the actuator of any one of Examples 1 to 16 comprises comparing the actuator's current motion state and a desired subsequent motion state against the grid of motion states classified as safe or unsafe to determine whether the current and/or the desired subsequent motion state are safe or not.

In Example 18, controlling the actuator of Example 17 comprises moving the actuator to the desired subsequent motion state if the actuator's current motion state and the desired subsequent motion state are classified as safe, executing a predefined safety procedure if the actuator's current motion state and/or the desired subsequent motion state are classified as unsafe.

Example 19 is an apparatus for classifying and/or controlling motion of an actuator. The apparatus comprises circuitry configured to classify potential motion states located within motion limits of the actuator as safe or unsafe based on one or more potential motion trajectories and motion state constraints, determine a current motion state of the actuator, and control the actuator based on the actuator's current motion state and a grid of potential motion states classified as safe or unsafe.

In Example 20, the circuitry of Example 19 is configured to, for each motion state of the potential motion states located within motion limits of the actuator, determine whether there exists a jerk trajectory that satisfies motion state constraints on position, velocity, and acceleration. If such a jerk trajectory is found, the circuitry is configured to classify the motion state under consideration as a safe motion state, otherwise classify it as unsafe.

In Example 21, the circuitry of Example 19 or 20 is configured to move the actuator to a desired subsequent motion state if the actuator's current motion state and the desired subsequent motion state are classified as safe or execute a predefined safety procedure if the actuator's current motion state and/or the desired subsequent motion state are classified as unsafe.

Example 22 is an apparatus for classifying and/or controlling motion of an actuator. The apparatus comprises circuitry configured to determine a motion state of the actuator, classify the motion state as safe or unsafe based on one or more potential motion trajectories and motion state constraints, and control the actuator based on whether the actuator's motion state has been classified as safe or unsafe.

In Example 23, the circuitry configured to determine a motion state of the actuator of Example 22 comprises one or more motion sensors.

In Example 24, the circuitry configured to determine the motion state of the actuator of Example 22 or 23 is comprises a predictor configured to predict the motion state based on one or more previous motions states.

In Example 25, the circuitry configured to classify the motion state of any one of Examples 22 to 24 comprises a neural network processor.

In Example 26, the circuitry configured to control the actuator of any one of Examples 22 to 25 implements a predefined safety procedure to avoid motion state constraint violation if the motion state is unsafe.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include local computer devices (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system may comprise any circuit or combination of circuits. In one embodiment, the computer system may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein. A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for controlling an actuator, comprising:

determining a grid of initial motion states, wherein each gridpoint of the grid represents an initial potential motion state, and each initial motion state is defined as a position-velocity-acceleration triplet located within motion limits of the actuator;

classifying each initial potential motion states of the grid as safe or unsafe by determining whether there exists a feasible jerk trajectory, starting from the initial motion state, that satisfies motion constraints on position, velocity, and acceleration, and jerk over a defined time horizon, wherein a safe state is one for which such a feasible trajectory exists, and an unsafe state is one for which no such trajectory exists;

determining a current motion state of the actuator; and controlling the actuator based on the classification of the actuator's current motion state desired motion states as safe or unsafe, wherein unsafe states trigger execution of a predefined safety procedure.

2. The method of claim 1, wherein position$\in[p_{min}, p_{max}]$, velocity$\in[v_{min}, v_{max}]$, and acceleration$\in[a_{min}, a_{max}]$.

3. The method of claim 2, wherein, for each initial motion state of the grid, acceleration, velocity and jerk trajectories are computed by integrating their respective higher order derivatives.

4. The method of claim 1, wherein a jerk trajectory at time k is j[k] and p[0], v[0], a[0] defines an initial motion state within the grid, and wherein an acceleration of the actuator at time k+1 is computed according to:

$$a[k+1] = a[k] + j[k]\cdot\Delta t$$

a velocity of the actuator at time k+1 is computed according to:

$$v[k+1] = v[k] + a[k]\cdot\Delta t + \frac{1}{2}\cdot j[k]\cdot\Delta t^2$$

a position of the actuator at time k+1 is computed according to:

$$p[k+1] = p[k] + v[k]\cdot\Delta t + \frac{1}{2}\cdot a[k]\cdot\Delta t^2 + \frac{1}{6}\cdot j[k]\cdot\Delta t^3.$$

5. The method of claim 4, wherein determining whether there exists a feasible jerk trajectory comprises determining whether the jerk trajectory at time k is within jerk limits, the acceleration trajectory at time k is within acceleration limits, the velocity trajectory at time k is within velocity limits, and the position trajectory at time k is within position limits.

6. The method of claim 1, wherein determining whether there exists a feasible jerk trajectory comprises determining whether there exists a jerk trajectory from an initial state of the initial grid to a final state, the jerk trajectory satisfying state constraints up to a terminal time.

7. The method of claim 6, wherein determining whether there exists a feasible jerk trajectory comprises determining a jerk trajectory that results in a time-optimum motion from the initial state of the initial grid to the final state.

8. The method of claim 7, wherein the final state at terminal time T satisfies $$v(T) = a(T) = 0.$$

9. The method of claim 1, wherein the jerk trajectory at time k is determined according to $j[k] \in \{j_{min}, j_{max}, 0\}$.

10. The method of claim 1, wherein the jerk trajectory from k=0 to k=K−1 is represented as:

$$j = \begin{bmatrix} j[0] \\ \vdots \\ j[K-1] \end{bmatrix} \in \mathbb{R}^K,$$

the acceleration trajectory from k=0 to k=K−1 is represented as:

$$a = \underbrace{a[0]\cdot \mathbb{1}}_{r_{acc}} + \underbrace{\Delta t\cdot S}_{A_{acc}}\cdot j,$$

the velocity trajectory from k=0 to k=K−1 is represented as:

$$v = \underbrace{v[0]\cdot\mathbb{1} + a[0]\cdot\Delta t\cdot S\cdot\mathbb{1}}_{r_{vel}} + \underbrace{\Delta t^2\cdot S\cdot\left(\frac{1}{2}S+1\right)}_{A_{vel}}\cdot j,$$

the position trajectory from k=0 to k=K−1 is represented as;

$$p = \underbrace{p[0]\cdot\mathbb{1} + v[0]\cdot\Delta t\cdot S\cdot\mathbb{1} + \frac{1}{2}a[0]\cdot\Delta t^2\cdot S + a[0]\cdot\Delta t^2\cdot S\cdot S\cdot\mathbb{1}}_{r_{pos}} + \underbrace{\Delta t^3\cdot\left(S\cdot S + S + \frac{1}{6}I\right)\cdot S}_{A_{pos}}\cdot j,$$

wherein $$S \in \mathbb{R}^{K\times K}$$

is based on:

$$a[k+1] = a[k] + j[k]\cdot\Delta t,$$

$$v[k+1] = v[k] + a[k]\cdot\Delta t + \frac{1}{2}\cdot j[k]\cdot\Delta t^2, \text{ and } p[k+1] = p[k] + v[k]\cdot\Delta t + \frac{1}{2}\cdot a[k]\cdot\Delta t^2 + \frac{1}{6}\cdot j[k]\cdot\Delta t^3 \text{ and } \mathbb{1} = [1, \ldots, 1] \in \mathbb{R}^K.$$

11. The method of claim 10, wherein determining whether there exists a feasible jerk trajectory comprises minimizing $\|r_{vel}+A_{vel}\,j\|^2+\|r_{acc}+A_{acc}\,j\|^2$.

12. The method of claim 11, wherein determining whether there exists a feasible jerk trajectory is based on;

$$\text{minimize}^K_{j\in\mathbb{R}} \quad \|r_{vel}+A_{vel}j\|^2+\|r_{acc}+A_{acc}j\|^2$$
$$\text{s.t.} \begin{cases} j_{min} \le j \le j_{max} \\ a_{min} \le r_{acc} + A_{acc}j \le a_{max} \\ v_{min} \le r_{vel} + A_{vel}j \le v_{max} \\ p_{min} \le r_{pos} + A_{pos}j \le p_{max} \end{cases}.$$

13. The method of claim 1, wherein determining whether there exists a feasible jerk trajectory comprises using a quadratically-constrained quadratic programming or conic quadratic programming algorithm.

14. The method of claim 1, wherein determining the actuator's current motion state comprises estimating, using one or more motion sensors, the actuator's current motion state.

15. The method of claim 1, wherein determining the actuator's current motion state comprises predicting the current motion state based on one or more previous motions states.

16. The method of claim 1, wherein controlling the actuator comprises comparing the actuator's current motion state and a desired subsequent motion state against the grid of motion states classified as safe or unsafe to determine whether the current and/or the desired subsequent motion state are safe or not.

17. The method of claim 16, wherein controlling the actuator comprises:

moving the actuator to the desired subsequent motion state if the actuator's current motion state and the desired subsequent motion state are classified as safe; or executing a predefined safety procedure if the actuator's current motion state and/or the desired subsequent motion state are classified as unsafe.

18. An apparatus for controlling an actuator, comprising circuitry configured to:

determine a grid of initial motion states, wherein each gridpoint of the grid represents an initial potential motion state, and each initial motion state is defined as a position-velocity-acceleration triplet located within motion limits of the actuator;

classify each initial potential motion states of the grid as safe or unsafe by determining whether there exists a feasible jerk trajectory, starting from the initial motion state, that satisfies motion constraints on position, velocity, and acceleration, and jerk over a defined time horizon, wherein a safe state is one for which such a feasible trajectory exists, and an unsafe state is one for which no such trajectory exists;

determine a current motion state of the actuator; and control the actuator based on the classification of the actuator's current motion state and desired motion state as safe or unsafe, wherein unsafe states trigger execution of a predefined safety procedure.

19. The apparatus of claim 18, wherein determining whether there exists a feasible jerk trajectory comprises determining whether there exists a jerk trajectory from an initial state of the initial grid to a final state, the jerk trajectory satisfying state constraints up to a terminal time.

20. The apparatus of claim 19, wherein determining whether there exists a feasible jerk trajectory comprises determining a jerk trajectory that results in a time-optimum motion from the initial state of the initial grid to the final state.

* * * * *